US012302265B2

(12) United States Patent
Tanaka et al.

(10) Patent No.: US 12,302,265 B2
(45) Date of Patent: May 13, 2025

(54) USER APPARATUS, BASE STATION, AND COMMUNICATION SYSTEM

(71) Applicant: Mitsubishi Electric Corporation, Chiyoda-ku (JP)

(72) Inventors: Toshiki Tanaka, Tokyo (JP); Tadahiro Shimoda, Tokyo (JP); Mitsuru Mochizuki, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 677 days.

(21) Appl. No.: 17/266,875

(22) PCT Filed: Sep. 9, 2019

(86) PCT No.: PCT/JP2019/035302
§ 371 (c)(1),
(2) Date: Feb. 8, 2021

(87) PCT Pub. No.: WO2020/054642
PCT Pub. Date: Mar. 19, 2020

(65) Prior Publication Data
US 2021/0297967 A1    Sep. 23, 2021

(30) Foreign Application Priority Data
Sep. 14, 2018   (JP) ................. 2018-172661

(51) Int. Cl.
*H04W 56/00*    (2009.01)
*H04L 1/1812*   (2023.01)
*H04W 74/0833*  (2024.01)

(52) U.S. Cl.
CPC ......... *H04W 56/001* (2013.01); *H04L 1/1812* (2013.01); *H04W 74/0833* (2013.01)

(58) Field of Classification Search
CPC ........... H04W 56/001; H04W 74/0833; H04W 56/0015; H04W 88/085; H04L 1/1812; H04L 1/1854; H04L 1/1896; H04B 7/022
See application file for complete search history.

(56) References Cited

U.S. PATENT DOCUMENTS

2012/0314569 A1* 12/2012 Liu ..................... H04W 36/304
370/252
2018/0054832 A1*  2/2018 Luo ........................ H04L 45/16
(Continued)

FOREIGN PATENT DOCUMENTS

EP    3 648 529 A1    5/2020
EP    3 651 526 A1    5/2020
(Continued)

OTHER PUBLICATIONS

Extended European Search Report issued May 4, 2022 in European Patent Application No. 19859435.0, 11 pages.
(Continued)

*Primary Examiner* — Kashif Siddiqui
(74) *Attorney, Agent, or Firm* — PROCOPIO, CORY, HARGREAVES & SAVITCH LLP

(57) ABSTRACT

A radio communication technology with small delay is provided. A communication system includes a communication terminal and a base station. The base station includes a plurality of transmitter-receivers configured to perform radio communication with the communication terminal. The base station is configured to perform radio communication with the communication terminal by using a part or all of the plurality of transmitter-receivers. The communication terminal receives a downlink synchronization signal from at least one transmitter-receiver to be newly connected, and establishes downlink synchronization with the at least one transmitter-receiver by using the downlink synchronization signal. The communication terminal receives a random (Continued)

access start order from the base station, performs random access processing by using the random access start order, and establishes uplink synchronization with the at least one transmitter-receiver.

4 Claims, 15 Drawing Sheets

(56) References Cited

U.S. PATENT DOCUMENTS

| | | | |
|---|---|---|---|
| 2018/0059712 A1* | 3/2018 | Kazehaya | G06F 1/12 |
| 2018/0083688 A1* | 3/2018 | Agiwal | H04W 12/033 |
| 2018/0098358 A1* | 4/2018 | Rico Alvarino | H04L 5/0092 |
| 2019/0052331 A1* | 2/2019 | Chang | H04B 7/08 |
| 2019/0313451 A1* | 10/2019 | Liu | H04W 74/0808 |
| 2019/0363843 A1* | 11/2019 | Gordaychik | H04W 72/044 |
| 2021/0083748 A1* | 3/2021 | Guan | H04B 7/0691 |
| 2021/0153262 A1 | 5/2021 | Mochizuki et al. | |

FOREIGN PATENT DOCUMENTS

| | | |
|---|---|---|
| EP | 3 836 651 A1 | 6/2021 |
| WO | WO 2018/070087 A1 | 4/2018 |
| WO | WO 2018/158926 A1 | 9/2018 |

OTHER PUBLICATIONS

Indian Office Action issued Nov. 25, 2022, in Indian Patent Application No. 202147007757, 7 pages.
"CR to 38.213 capturing the RAN1#94 meeting agreements" 3GPP Draft, TSG RAN WG1 Meeting #94, R1-1810020, Sep. 6, 2018, 96 pages.
"LTE; Evolved Universal Terrestrial Radio Access (E-UTRA) and Evolved Universal Terrestrial Radio Access Network (E-UTRAN); Overall description; Stage 2 (3GPP TS 36.300 version 15.2.0 Release 15)," ETSI TS 136 300 V15.2.0, Jul. 2018, total pp. 375.
"LS on HNB/HeNB Open Access Mode," 3GPP TSG-SA1 #42, Oct. 13-17, 2008, S1-083461 total pp. 2.
"3rd Generation Partnership Project; Technical Specification Group Radio Access Network; Evolved Universal Terrestrial Radio Access (E-UTRA); Further advancements for E-UTRA physical layer aspects (Release 9)," 3GPP TR 36.814 V9.2.0, Mar. 2017, total pp. 105.
"LTE; Feasibility study for Further Advancements for E-UTRA (LTE-Advanced) (3GPP TR 36.912 version 15.0.0 Release 15)," ETSI TR 136 912 V15.0.0, Jul. 2018, total pp. 63.
"Scenarios, requirements and KPIs for 5G mobile and wireless system," Mobile and wireless communications Enablers for the Twenty-twenty Information Society (METIS), Apr. 4, 2014, total pp. 84.
"3rd Generation Partnership Project; Technical Specification Group Services and System Aspects; Study on Architecture for Next Generation System (Release 14)," 3GPP TR 23.799 V14.0.0, Dec. 2016, total pp. 522.
"3rd Generation Partnership Project; Technical Specification Group Radio Access Network; Study on new radio access technology: Radio access architecture and interfaces (Release 14)," 3GPP TR 38.801 V14.0.0, Mar. 2017, total pp. 91.

"3rd Generation Partnership Project; Technical Specification Group Radio Access Network; Study on New Radio Access Technology Physical Layer Aspects (Release 14)," 3GPP Tr 38.802 V14.2.0, Sep. 2017, total pp. 144.
"3rd Generation Partnership Project; Technical Specification Group Radio Access Network; Study on New Radio Access Technology; Radio Interface Protocol Aspects (Release 14)," 3GPP TR 38.804 V14.0.0, Mar. 2017, total pp. 57.
"3rd Generation Partnership Project; Technical Specification Group Radio Access Network; Study on New Radio (NR) access technology (Release 14)," 3GPP TR 38.912, Jun. 2017, total pp. 74.
"Work Item on New Radio (NR) Access Technology," 3GPP TSG RAN Meeting #77, Sep. 11-14, 2017, RP-172115, total pp. 47.
"3rd Generation Partnership Project; Technical Specification Group Radio Access Network; Evolved Universal Terrestrial Radio Access (E-UTRA) and NR; Multi-connectivity; Stage 2 (Release 15)," 3GPP TS 37.340 V15.2.0, Jun. 2018, total pp. 55.
"3rd Generation Partnership Project; Technical Specification Group Radio Access Network; NR; Physical channels and modulation (Release 15)," 3GPP TS 38.211 V15.2.0, Jun. 2018, total pp. 93.
"3rd Generation Partnership Project; Technical Specification Group Radio Access Network; NR; Physical layer procedures for control (Release 15)," 3GPP TS 38.213 V15.2.0, Jun. 2018, total pp. 98.
"3rd Generation Partnership Project; Technical Specification Group Radio Access Network; NR; Physical layer procedures for data (Release 15)," 3GPP TS 38.214 V15.2.0, Jun. 2018, total pp. 95.
"3rd Generation Partnership Project; Technical Specification Group Radio Access Network; NR; NR and NG-RAN Overall Description; Stage 2 (Release 15)," 3GPP TS 38.300 V15.2.0, Jun. 2018, total pp. 87.
"3rd Generation Partnership Project; Technical Specification Group Radio Access Network; NR; Medium Access Control (MAC) protocol specification (Release 15)," 3GPP TS 38.321 V15.2.0, Jun. 2018, total pp. 73.
"3rd Generation Partnership Project; Technical Specification Group Radio Access Network; NR; Multiplexing and channel coding (Release 15)," 3GPP TS 38.212 V15.2.0, Jun. 2018, total pp. 94.
"5g Architecture Options—Full Set," Joint Ran/SA Meeting, Jun. 14, 2016, RP-161266, total pp. 11.
"Enhancements on MIMO for NR," 3GPP TSG RAN Meeting #80, Jun. 11-14, 2018, RP-181453, total pp. 6.
"Summary of Remaining Details on RACH Procedure," 3GPP TSG-RAN WG1 93, May 21-25, 2018, R1-1807633, total pp. 22.
"3rd Generation Partnership Project; Technical Specification Group Radio Access Network; Evolved Universal Terrestrial Radio Access (E-UTRA); Radio Resource Control (RRC); Protocol specification (Release 15)," 3GPP TS 36.331 V15.2.2, Jun. 2018, total pp. 791.
"Views on multi-panel/TRP MIMO transmission," 3GPP TSG RAN WG1 Meeting #94b, Oct. 8-12, 2018, R1-1811483, total pp. 6.
International Search Report issued on Oct. 15, 2019 in PCT/JP2019/035302 filed on Sep. 9, 2019, 2 pages.
Combined Chinese Office Action and Search Report issued Nov. 8, 2023 in Chinese Application 201980058910.6, (with unedited computer-generated English translation), 19 pages.
Extended European Search Report Issued Nov. 20, 2023 in European Application 23195950.3, 12 pages.
Japanese Office Action issued on Aug. 22, 2023 in Japanese Patent Application No. 2020-545999 (with English translation), 8 pages.

\* cited by examiner

F I G. 1
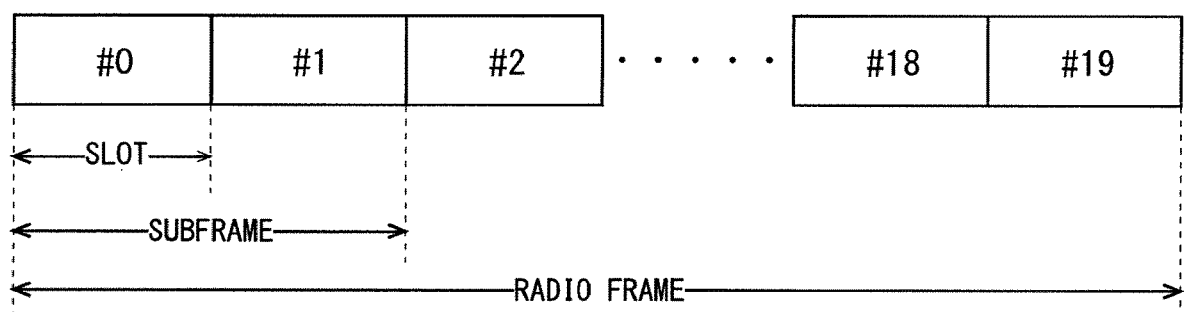
F I G. 2
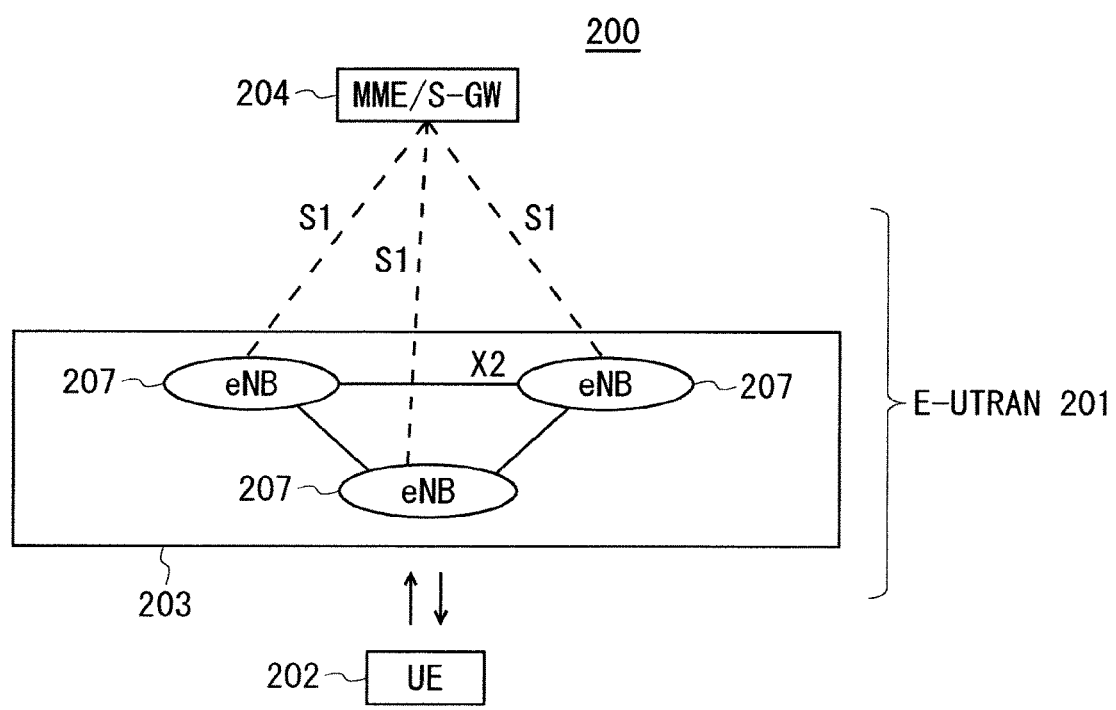

F I G. 3
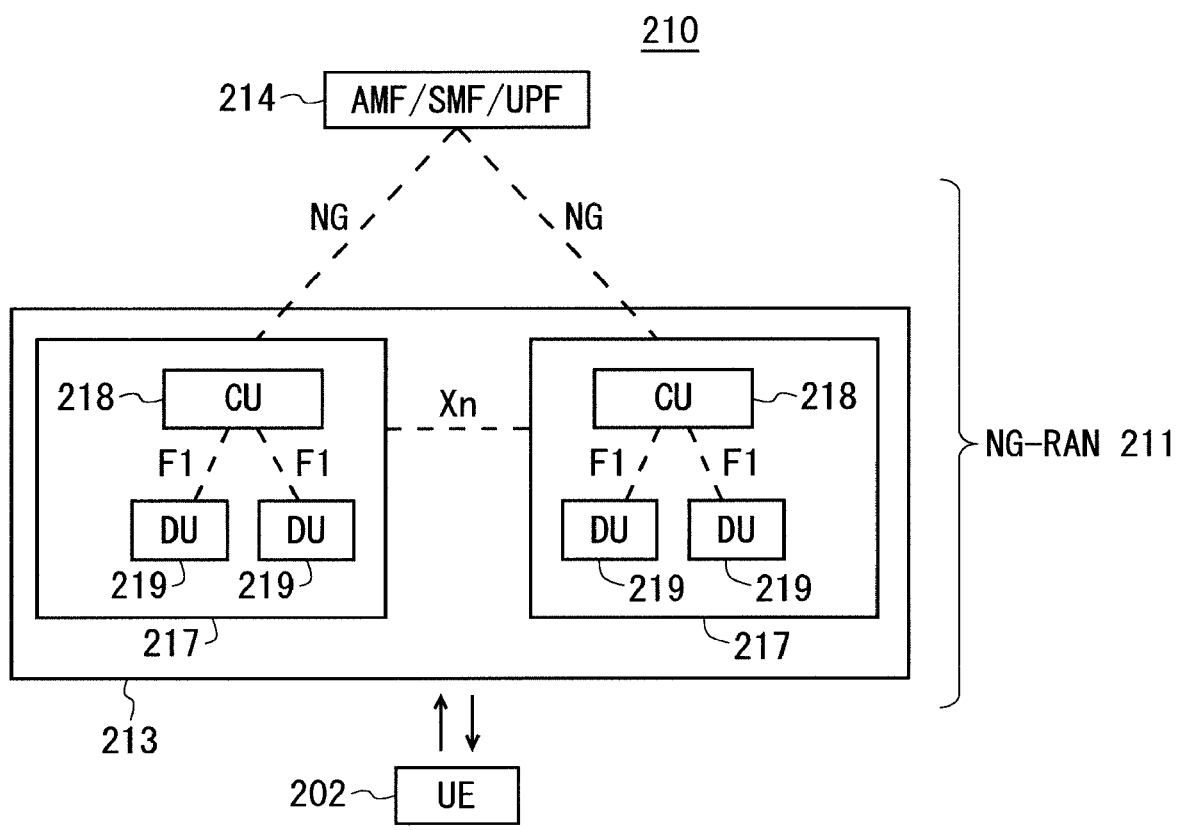

F I G. 6
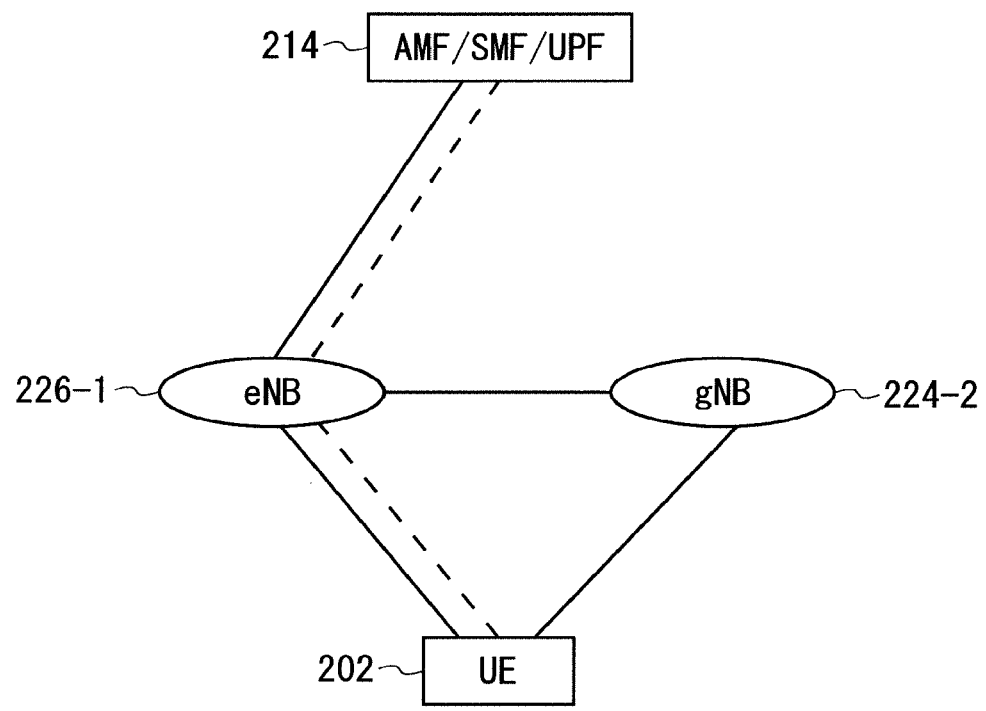

F I G. 1 3
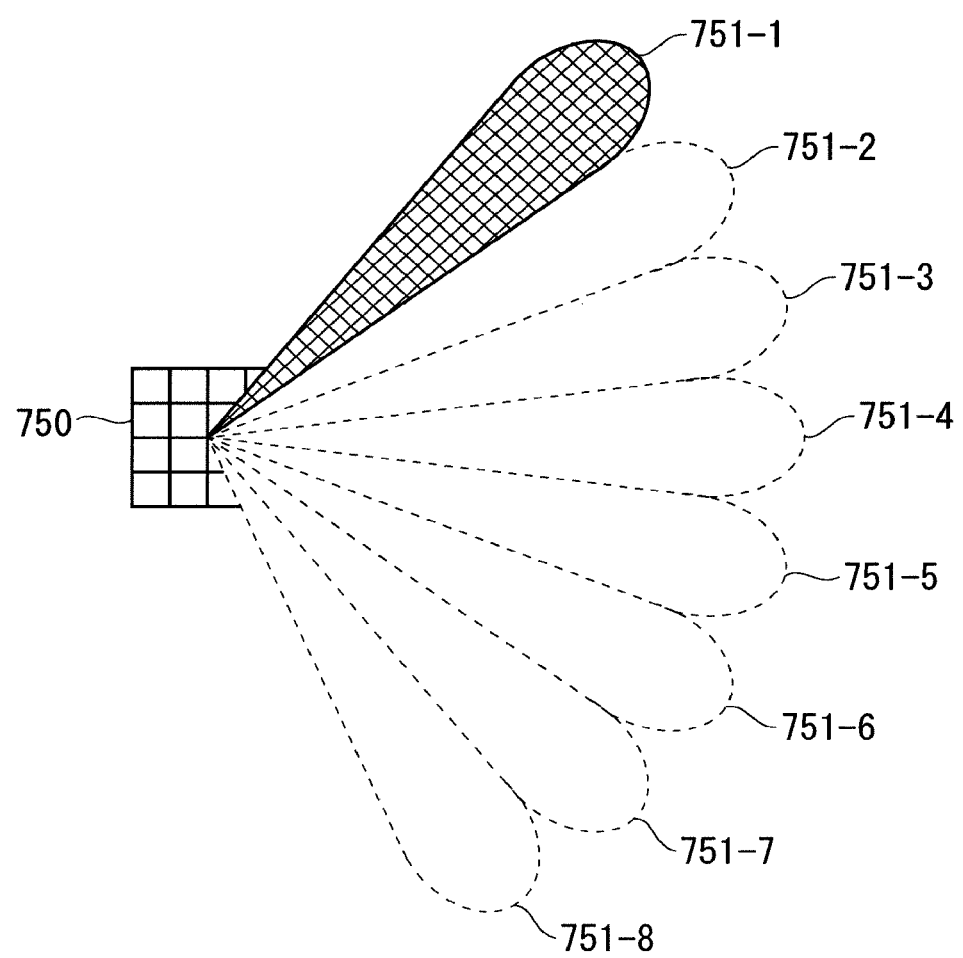

F I G. 1 6
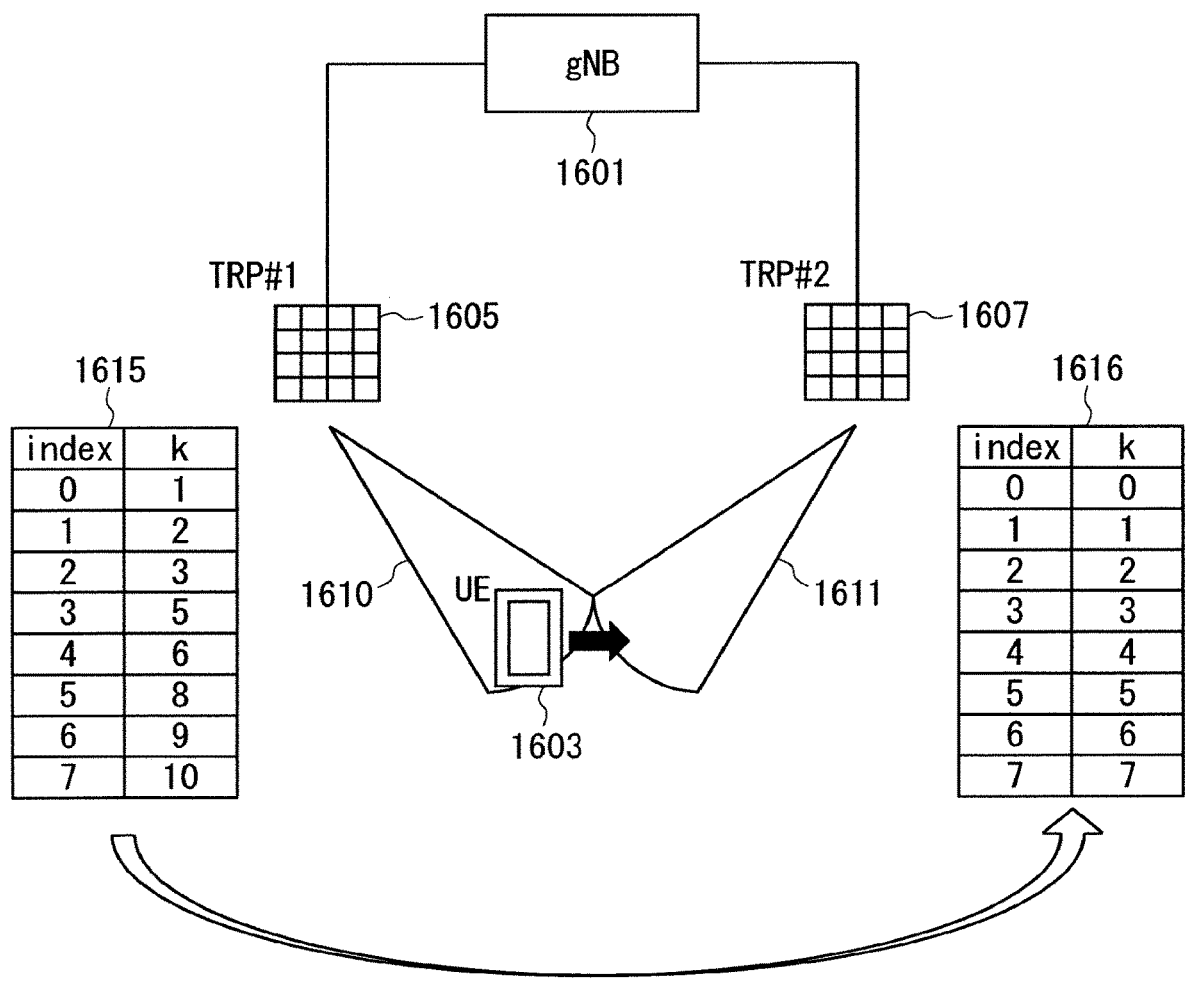

USER APPARATUS, BASE STATION, AND COMMUNICATION SYSTEM

TECHNICAL FIELD

The present invention relates to a radio communication technology.

BACKGROUND ART

The 3rd generation partnership project (3GPP), the standard organization regarding the mobile communication system, is studying communication systems referred to as long term evolution (LTE) regarding radio sections and system architecture evolution (SAE) regarding the overall system configuration including a core network and a radio access network which is hereinafter collectively referred to as a network as well (for example, see Non-Patent Documents 1 to 5). This communication system is also referred to as 3.9 generation (3.9 G) system.

As the access scheme of the LTE, orthogonal frequency division multiplexing (OFDM) is used in a downlink direction and single carrier frequency division multiple access (SC-FDMA) is used in an uplink direction. Further, differently from the wideband code division multiple access (W-CDMA), circuit switching is not provided but a packet communication system is only provided in the LTE.

The decisions taken in 3GPP regarding the frame configuration in the LTE system described in Non-Patent Document 1 (Chapter 5) are described with reference to FIG. 1. FIG. 1 is a diagram illustrating the configuration of a radio frame used in the LTE communication system. With reference to FIG. 1, one radio frame is 10 ms. The radio frame is divided into ten equally sized subframes. The subframe is divided into two equally sized slots. The first and sixth subframes contain a downlink synchronization signal per radio frame. The synchronization signals are classified into a primary synchronization signal (P-SS) and a secondary synchronization signal (S-SS).

Non-Patent Document 1 (Chapter 5) describes the decisions by 3GPP regarding the channel configuration in the LTE system. It is assumed that the same channel configuration is used in a closed subscriber group (CSG) cell as that of a non-CSG cell.

A physical broadcast channel (PBCH) is a channel for downlink transmission from a base station device (hereinafter may be simply referred to as a "base station") to a communication terminal device (hereinafter may be simply referred to as a "communication terminal") such as a user equipment device (hereinafter may be simply referred to as a "user equipment"). A BCH transport block is mapped to four subframes within a 40 ms interval. There is no explicit signaling indicating 40 ms timing.

A physical control format indicator channel (PCFICH) is a channel for downlink transmission from a base station to a communication terminal. The PCFICH notifies the number of orthogonal frequency division multiplexing (OFDM) symbols used for PDCCHs from the base station to the communication terminal. The PCFICH is transmitted per subframe.

A physical downlink control channel (PDCCH) is a channel for downlink transmission from a base station to a communication terminal. The PDCCH notifies of the resource allocation information for downlink shared channel (DL-SCH) being one of the transport channels described below, resource allocation information for a paging channel (PCH) being one of the transport channels described below, and hybrid automatic repeat request (HARQ) information related to DL-SCH. The PDCCH carries an uplink scheduling grant. The PDCCH carries acknowledgement (Ack)/ negative acknowledgement (Nack) that is a response signal to uplink transmission. The PDCCH is referred to as an L1/L2 control signal as well.

A physical downlink shared channel (PDSCH) is a channel for downlink transmission from a base station to a communication terminal. A downlink shared channel (DL-SCH) that is a transport channel and a PCH that is a transport channel are mapped to the PDSCH.

A physical multicast channel (PMCH) is a channel for downlink transmission from a base station to a communication terminal. A multicast channel (MCH) that is a transport channel is mapped to the PMCH.

A physical uplink control channel (PUCCH) is a channel for uplink transmission from a communication terminal to a base station. The PUCCH carries Ack/Nack that is a response signal to downlink transmission. The PUCCH carries channel state information (CSI). The CSI includes a rank indicator (RI), a precoding matrix indicator (PMI), and a channel quality indicator (CQI) report. The RI is rank information of a channel matrix in the MIMO. The PMI is information of a precoding weight matrix to be used in the MIMO. The CQI is quality information indicating the quality of received data or channel quality. In addition, the PUCCH carries a scheduling request (SR).

A physical uplink shared channel (PUSCH) is a channel for uplink transmission from a communication terminal to a base station. An uplink shared channel (UL-SCH) that is one of the transport channels is mapped to the PUSCH.

A physical hybrid ARQ indicator channel (PHICH) is a channel for downlink transmission from a base station to a communication terminal. The PHICH carries Ack/Nack that is a response signal to uplink transmission. A physical random access channel (PRACH) is a channel for uplink transmission from the communication terminal to the base station. The PRACH carries a random access preamble.

A downlink reference signal (RS) is a known symbol in the LTE communication system. The following five types of downlink reference signals are defined as: a cell-specific reference signal (CRS), an MBSFN reference signal, a data demodulation reference signal (DM-RS) being a UE-specific reference signal, a positioning reference signal (PRS), and a channel state information reference signal (CSI-RS). The physical layer measurement objects of a communication terminal include reference signal received powers (RSRPs).

An uplink reference signal is also a known symbol in the LTE communication system. The following two types of uplink reference signals are defined, that is, a demodulation reference signal (DM-RS) and a sounding reference signal (SRS).

The transport channels described in Non-Patent Document 1 (Chapter 5) are described. A broadcast channel (BCH) among the downlink transport channels is broadcast to the entire coverage of a base station (cell). The BCH is mapped to the physical broadcast channel (PBCH).

Retransmission control according to a hybrid ARQ (HARQ) is applied to a downlink shared channel (DL-SCH). The DL-SCH can be broadcast to the entire coverage of the base station (cell). The DL-SCH supports dynamic or semi-static resource allocation. The semi-static resource allocation is also referred to as persistent scheduling. The DL-SCH supports discontinuous reception (DRX) of a communication terminal for enabling the communication terminal to save power. The DL-SCH is mapped to the physical downlink shared channel (PDSCH).

The paging channel (PCH) supports DRX of the communication terminal for enabling the communication terminal to save power. The PCH is required to be broadcast to the entire coverage of the base station (cell). The PCH is mapped to physical resources such as the physical downlink shared channel (PDSCH) that can be used dynamically for traffic.

The multicast channel (MCH) is used for broadcasting the entire coverage of the base station (cell). The MCH supports SFN combining of multimedia broadcast multicast service (MBMS) services (MTCH and MCCH) in multi-cell transmission. The MCH supports semi-static resource allocation. The MCH is mapped to the PMCH.

Retransmission control according to a hybrid ARQ (HARQ) is applied to an uplink shared channel (UL-SCH) among the uplink transport channels. The UL-SCH supports dynamic or semi-static resource allocation. The UL-SCH is mapped to the physical uplink shared channel (PUSCH).

A random access channel (RACH) is limited to control information. The RACH involves a collision risk. The RACH is mapped to the physical random access channel (PRACH).

The HARQ is described. The HARQ is the technique for improving the communication quality of a channel by combination of automatic repeat request (ARQ) and error correction (forward error correction). The HARQ is advantageous in that error correction functions effectively by retransmission even for a channel whose communication quality changes. In particular, it is also possible to achieve further quality improvement in retransmission through combination of the reception results of the first transmission and the reception results of the retransmission.

An example of the retransmission method is described. If the receiver fails to successfully decode the received data, in other words, if a cyclic redundancy check (CRC) error occurs (CRC=NG), the receiver transmits "Nack" to the transmitter. The transmitter that has received "Nack" retransmits the data. If the receiver successfully decodes the received data, in other words, if a CRC error does not occur (CRC=OK), the receiver transmits "Ack" to the transmitter. The transmitter that has received "Ack" transmits the next data.

The logical channels described in Non-Patent Document 1 (Chapter 6) are described. A broadcast control channel (BCCH) is a downlink channel for broadcast system control information. The BCCH that is a logical channel is mapped to the broadcast channel (BCH) or downlink shared channel (DL-SCH) that is a transport channel.

A paging control channel (PCCH) is a downlink channel for transmitting paging information and system information change notifications. The PCCH is used when the network does not know the cell location of a communication terminal. The PCCH that is a logical channel is mapped to the paging channel (PCH) that is a transport channel.

A common control channel (CCCH) is a channel for transmission control information between communication terminals and a base station. The CCCH is used in a case where the communication terminals have no RRC connection with the network. In the downlink direction, the CCCH is mapped to the downlink shared channel (DL-SCH) that is a transport channel. In the uplink direction, the CCCH is mapped to the uplink shared channel (UL-SCH) that is a transport channel.

A multicast control channel (MCCH) is a downlink channel for point-to-multipoint transmission. The MCCH is used for transmission of MBMS control information for one or several MTCHs from a network to a communication terminal. The MCCH is used only by a communication terminal during reception of the MBMS. The MCCH is mapped to the multicast channel (MCH) that is a transport channel.

A dedicated control channel (DCCH) is a channel that transmits dedicated control information between a communication terminal and a network on a point-to-point basis. The DCCH is used when the communication terminal has an RRC connection. The DCCH is mapped to the uplink shared channel (UL-SCH) in uplink and mapped to the downlink shared channel (DL-SCH) in downlink.

A dedicated traffic channel (DTCH) is a point-to-point communication channel for transmission of user information to a dedicated communication terminal. The DTCH exists in uplink as well as downlink. The DTCH is mapped to the uplink shared channel (UL-SCH) in uplink and mapped to the downlink shared channel (DL-SCH) in downlink.

A multicast traffic channel (MTCH) is a downlink channel for traffic data transmission from a network to a communication terminal. The MTCH is a channel used only by a communication terminal during reception of the MBMS. The MTCH is mapped to the multicast channel (MCH).

CGI represents a cell global identifier. ECGI represents an E-UTRAN cell global identifier. A closed subscriber group (CSG) cell is introduced into the LTE, and the long term evolution advanced (LTE-A) and universal mobile telecommunication system (UMTS) described below.

The locations of communication terminals are tracked based on an area composed of one or more cells. The locations are tracked for enabling tracking the locations of communication terminals and calling communication terminals, in other words, incoming calling to communication terminals even in an idle state. An area for tracking locations of communication terminals is referred to as a tracking area.

Further, specifications of long term evolution advanced (LTE-A) are pursued as Release 10 in 3GPP (see Non-Patent Documents 3 and 4). The LTE-A is based on the LTE radio communication system and is configured by adding several new techniques to the system.

Carrier aggregation (CA) is studied for the LTE-A system in which two or more component carriers (CCs) are aggregated to support wider transmission bandwidths up to 100 MHz. Non-Patent Document 1 describes the CA.

In a case where CA is configured, a UE has a single RRC connection with a network (NW). In RRC connection, one serving cell provides NAS mobility information and security input. This cell is referred to as a primary cell (PCell). In downlink, a carrier corresponding to PCell is a downlink primary component carrier (DL PCC). In uplink, a carrier corresponding to PCell is an uplink primary component carrier (UL PCC).

A secondary cell (SCell) is configured to form a serving cell group with a PCell, in accordance with the UE capability. In downlink, a carrier corresponding to SCell is a downlink secondary component carrier (DL SCC). In uplink, a carrier corresponding to SCell is an uplink secondary component carrier (UL SCC).

A serving cell group of one PCell and one or more SCells is configured for one UE.

The new techniques in the LTE-A include the technique of supporting wider bands (wider bandwidth extension) and the coordinated multiple point transmission and reception (CoMP) technique. The CoMP studied for LTE-A in 3GPP is described in Non-Patent Document 1.

Furthermore, the use of small eNBs (hereinafter also referred to as "small-scale base station devices") configuring small cells is studied in 3GPP to satisfy tremendous traffic in the future. In an example technique under study, a large number of small eNBs is installed to configure a large number of small cells, which increases spectral efficiency and communication capacity. The specific techniques include dual connectivity (abbreviated as DC) with which a UE communicates with two eNBs through connection thereto. Non-Patent Document 1 describes the DC.

For eNBs that perform dual connectivity (DC), one may be referred to as a master eNB (abbreviated as MeNB), and the other may be referred to as a secondary eNB (abbreviated as SeNB).

The traffic flow of a mobile network is on the rise, and the communication rate is also increasing. It is expected that the communication rate is further increased when the operations of the LTE and the LTE-A are fully initiated.

For increasingly enhanced mobile communications, the fifth generation (hereinafter also referred to as "5G") radio access system is studied whose service is aimed to be launched in 2020 and afterward. For example, in the Europe, an organization named METIS summarizes the requirements for 5G (see Non-Patent Document 5).

The requirements in the 5G radio access system show that a system capacity shall be 1000 times as high as, a data transmission rate shall be 100 times as high as, a data latency shall be one tenth ($\frac{1}{10}$) as low as, and simultaneously connected communication terminals 100 times as many as those of the LTE system, to further reduce the power consumption and device cost.

To satisfy such requirements, the study of 5G standards is pursued as Release 15 in 3GPP (see Non-Patent Documents 6 to 18). The techniques on 5G radio sections are referred to as "New Radio Access Technology" ("New Radio" is abbreviated as NR).

The NR system has been studied based on the LTE system and the LTE-A system. The NR system includes additions and changes from the LTE system and the LTE-A system in the following points.

As the access schemes of the NR, the orthogonal frequency division multiplexing (OFDM) is used in the downlink direction, and the OFDM and the DFT-spread-OFDM (DFT-s-OFDM) are used in the uplink direction.

In NR, frequencies higher than those in the LTE are available for increasing the transmission rate and reducing the latency.

In NR, a cell coverage is maintained by forming a transmission/reception range shaped like a narrow beam (beamforming) and also changing the orientation of the beam (beam sweeping).

In NR, various subcarrier spacings, that is, various numerologies are supported. Regardless of the numerologies, 1 subframe is 1 millisecond long, and 1 slot consists of 14 symbols in NR. Furthermore, the number of slots in 1 subframe is one in a numerology at a subcarrier spacing of 15 kHz. The number of slots increases in proportion to the subcarrier spacing in the other numerologies (see Non-Patent Document 13 (TS38.211 v15.0.0)).

The base station transmits a downlink synchronization signal in NR as synchronization signal burst (may be hereinafter referred to as SS burst) with a predetermined period for a predetermined duration. The SS burst includes synchronization signal blocks (may be hereinafter referred to as SS blocks) for each beam of the base station. The base station transmits the SS blocks for each beam during the duration of the SS burst with the beam changed. The SS blocks include the P-SS, the S-SS, and the PBCH.

In NR, addition of a phase tracking reference signal (PTRS) as a downlink reference signal has reduced the influence of phase noise. The PTRS has also been added as an uplink reference signal similarly to the downlink.

In NR, a slot format indication (SFI) has been added to information included in the PDCCH for flexibly switching between the DL and the UL in a slot.

Also in NR, the base station preconfigures, for the UE, a part of a carrier frequency band (may be hereinafter referred to as a Bandwidth Part (BWP)). Then, the UE performs transmission and reception with the base station in the BWP. Consequently, the power consumption in the UE is reduced.

The DC patterns studied in 3GPP include the DC to be performed between an LTE base station and an NR base station that are connected to the EPC, the DC to be performed by the NR base stations that are connected to the 5G core system, and the DC to be performed between the LTE base station and the NR base station that are connected to the 5G core system (see Non-Patent Documents 12, 16, and 19).

Further, in 3GPP, several new technologies are studied. For example, communication reliability enhancement by support of a plurality of transmission reception points (TRPs) in the base station (see Non-Patent Document 20) and the like are studied.

PRIOR ART DOCUMENTS

Non-Patent Documents

Non-Patent Document 1: 3GPP TS 36.300 V15.2.0
Non-Patent Document 2: 3GPP S1-083461
Non-Patent Document 3: 3GPP TR 36.814 V9.2.0
Non-Patent Document 4: 3GPP TR 36.912 V15.0.0
Non-Patent Document 5: "Scenarios, requirements and KPIs for 5G mobile and wireless system", ICT-317669-METIS/D1.1
Non-Patent Document 6: 3GPP TR 23.799 V14.0.0
Non-Patent Document 7: 3GPP TR 38.801 V14.0.0
Non-Patent Document 8: 3GPP TR 38.802 V14.2.0
Non-Patent Document 9: 3GPP TR 38.804 V14.0.0
Non-Patent Document 10: 3GPP TR 38.912 V14.1.0
Non-Patent Document 11: 3GPP RP-172115
Non-Patent Document 12: 3GPP TS 37.340 V15.2.0
Non-Patent Document 13: 3GPP TS 38.211 V15.2.0
Non-Patent Document 14: 3GPP TS 38.213 V15.2.0
Non-Patent Document 15: 3GPP TS 38.214 V15.2.0
Non-Patent Document 16: 3GPP TS 38.300 V15.2.0
Non-Patent Document 17: 3GPP TS 38.321 V15.2.0
Non-Patent Document 18: 3GPP TS 38.212 V15.2.0
Non-Patent Document 19: 3GPP RP-161266
Non-Patent Document 20: 3GPP RP-181453
Non-Patent Document 21: 3GPP R1-1807633
Non-Patent Document 22: 3GPP TS 36.331 V15.2.2

SUMMARY

Problem to be Solved by the Invention

When random access (see Non-Patent Document 21) using a PDCCH order is used for connection destination switch of TRPs under the base station in the UE, downlink synchronization in a switch destination TRP needs to be established between PDCCH reception and PRACH transmission. Thus, the UE cannot perform PRACH transmission in the first PRACH transmission occasion after elapse of minimum time (see Non-Patent Document 14) from the PDCCH reception to the PRACH transmission. As a result, there is a problem that TRP switch processing in the UE cannot be promptly executed.

In the light of the problem described above, the present invention has an object to provide a radio communication technology with small delay in LTE and NR.

Means to Solve the Problem

According to the present invention, provided is a communication system including: a communication terminal; and a base station including a plurality of transmitter-receivers configured to perform radio communication with the communication terminal, the base station being configured to perform radio communication with the communication terminal by using a part or all of the plurality of transmitter-receivers. The communication terminal receives a downlink synchronization signal from at least one transmitter-receiver to be newly connected, and establishes downlink synchronization with the at least one transmitter-receiver by using the downlink synchronization signal. The communication terminal receives a random access start order from the base station, performs random access processing by using the random access start order, and establishes uplink synchronization with the at least one transmitter-receiver.

Further, according to the present invention, provided is a communication terminal being configured to perform radio communication with a base station including a plurality of transmitter-receivers via a part or all of the plurality of transmitter-receivers. The communication terminal receives a downlink synchronization signal from at least one transmitter-receiver to be newly connected, and establishes downlink synchronization with the at least one transmitter-receiver by using the downlink synchronization signal. The communication terminal receives a random access start order from the base station, performs random access processing by using the random access start order, and establishes uplink synchronization with the at least one transmitter-receiver.

Further, according to the present invention, provided is a base station being configured to perform radio communication with a communication terminal. The base station includes a plurality of transmitter-receivers, and is configured to perform radio communication with the communication terminal by using a part or all of the plurality of transmitter-receivers. The base station transmits, to the communication terminal, a random access start order for starting random access for establishing uplink synchronization with at least one transmitter-receiver to be newly connected to the communication terminal.

Effects of the Invention

According to the present invention, the radio communication technology with small delay can be provided.

The objects, features, aspects and advantages of the present invention will become more apparent from the following detailed description of the present invention when taken in conjunction with the accompanying drawings.

BRIEF DESCRIPTION OF DRAWINGS

FIG. 1 is a diagram illustrating the configuration of a radio frame for use in an LTE communication system.

FIG. 2 is a block diagram showing the overall configuration of an LTE communication system 200 under discussion of 3GPP.

FIG. 3 is a block diagram illustrating an overall configuration of a NR communication system 210 that has been discussed in 3GPP.

FIG. 6 illustrates a structure of the DC to be performed by the eNB and the gNB that are connected to the NG core.

FIG. 13 illustrates an example structure of a cell in an NR system.

FIG. 16 is a diagram illustrating switch of candidates of the number of slots from downlink data reception to a HARQ response in TRP switch of the UE according to a second embodiment.

DESCRIPTION OF EMBODIMENTS

The First Embodiment

Figure 4:
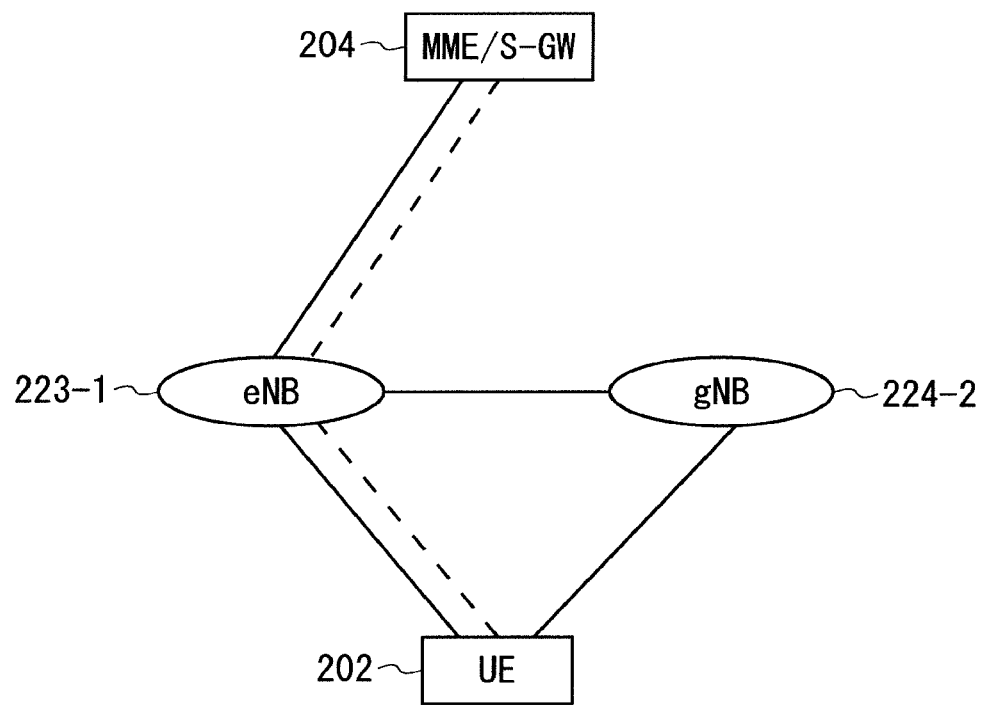
FIG. 4 illustrates a structure of the DC to be performed by an eNB and a gNB that are connected to the EPC.

FIG. 2 is a block diagram showing an overall configuration of an LTE communication system 200 which is under discussion of 3GPP. FIG. 2 is described here. A radio access network is referred to as an evolved universal terrestrial radio access network (E-UTRAN) 201. A user equipment device (hereinafter, referred to as a "user equipment (UE)") 202 that is a communication terminal device is capable of radio communication with a base station device (hereinafter, referred to as a "base station (E-UTRAN Node B: eNB)") 203 and transmits and receives signals through radio communication.

Here, the "communication terminal device" covers not only a user equipment device such as a mobile phone terminal device, but also an unmovable device such as a sensor. In the following description, the "communication terminal device" may be simply referred to as a "communication terminal".

The E-UTRAN is composed of one or a plurality of base stations 203, provided that a control protocol for the user equipment 202 such as a radio resource control (RRC), and user planes (hereinafter also referred to as "U-planes") such as a packet data convergence protocol (PDCP), radio link control (RLC), medium access control (MAC), or physical layer (PHY) are terminated in the base station 203.

The control protocol radio resource control (RRC) between the user equipment 202 and the base station 203 performs, for example, broadcast, paging, and RRC connection management. The states of the base station 203 and the user equipment 202 in RRC are classified into RRC_IDLE and RRC_CONNECTED.

In RRC_IDLE, public land mobile network (PLMN) selection, system information (SI) broadcast, paging, cell reselection, mobility, and the like are performed. In RRC_CONNECTED, the user equipment has RRC connection and is capable of transmitting and receiving data to and from a network. In RRC_CONNECTED, for example, handover (HO) and measurement of a neighbor cell are performed.

The base stations 203 includes one or more eNBs 207. A system, composed of an evolved packet core (EPC) being a core network and an E-UTRAN 201 being a radio access network, is referred to as an evolved packet system (EPS). The EPC being a core network and the E-UTRAN 201 being a radio access network may be collectively referred to as a "network".

The eNB 207 is connected to an MME/S-GW unit (hereinafter, also referred to as an "MME unit") 204 including a mobility management entity (MME), a serving gateway (S-GW) or an MME and an S-GW by means of an S1 interface, and control information is communicated between the eNB 207 and the MME unit 204. A plurality of MME units 204 may be connected to one eNB 207. The eNBs 207 are connected to each other by means of an X2 interface, and control information is communicated between the eNBs 207.

The MME unit 204 is a high-level device, specifically, a high-level node, and controls connection between the user equipment (UE) 202 and the eNBs 207 comprising a base station. The MME unit 204 configures the EPC that is a core network. The base station 203 configures the E-UTRAN 201.

The base station 203 may configure one or more cells. Each of the cells has a predefined range as a coverage that is a range in which communication with the user equipment 202 is possible, and performs radio communication with the user equipment 202 within the coverage. When the one base station 203 configures a plurality of cells, each of the cells is configured to communicate with the user equipment 202.

FIG. 3 is a block diagram illustrating an overall configuration of a 5G communication system 210 that has been discussed in 3GPP. FIG. 3 is described. A radio access network is referred to as a next generation radio access network (NG-RAN) 211. The UE 202 can perform radio communication with an NR base station device (hereinafter referred to as a "NG-RAN NodeB (gNB)") 213, and transmits and receives signals to and from the NR base station device 213 via radio communication. Furthermore, the core network is referred to as a 5G Core (5GC).

When control protocols for the UE 212, for example, Radio Resource Control (RRC) and user planes (may be hereinafter referred to as U-Planes), e.g., Service Data Adaptation Protocol (SDAP), Packet Data Convergence Protocol (PDCP), Radio Link Control (RLC), Medium Access Control (MAC), and Physical Layer (PHY) are terminated in the NR base station 213, one or more NR base stations 213 configure the NG-RAN.

The functions of the control protocol of the Radio Resource Control (RRC) between the UE 202 and the NR base station 213 are identical to those in LTE. The states of the NR base station 213 and the UE 202 in RRC include RRC_IDLE, RRC_CONNECTED, and RRC_INACTIVE.

RRC_IDLE and RRC_CONNECTED are identical to those in LTE. In RRC_INACTIVE, for example, broadcast of system information (SI), paging, cell reselection, and mobility are performed while the connection between the 5G Core and the NR base station 213 is maintained.

Through an NG interface, gNBs 217 are connected to the Access and Mobility Management Function (AMF), the Session Management Function (SMF), the User Plane Function (UPF), or an AMF/SMF/UPF unit (may be hereinafter referred to as a 5GC unit) 214 including the AMF, the SMF, and the UPF. The control information and/or user data are communicated between each of the gNBs 217 and the 5GC unit 214. The NG interface is a generic name for an N2 interface between the gNBs 217 and the AMF, an N3 interface between the gNBs 217 and the UPF, an N11 interface between the AMF and the SMF, and an N4 interface between the UPF and the SMF. A plurality of the 5GC units 214 may be connected to one of the gNBs 217. The gNBs 217 are connected through an Xn interface, and the control information and/or user data are communicated between the gNBs 217.

The NR base station 213 may configure one or more cells in the same manner as the base station 203. When the one NR base station 213 configures a plurality of cells, each of the cells is configured to communicate with the UE 202.

Each of the gNBs 217 may be divided into a Central Unit (may be hereinafter referred to as a CU) 218 and Distributed Units (may be hereinafter referred to as DUs) 219. The one CU 218 is configured in the gNB 217. The number of the DUs 219 configured in the gNB 217 is one or more. The CU 218 is connected to the DUs 219 via an F1 interface, and the control information and/or user data are communicated between the CU 218 and each of the DUs 219.

FIG. 4 illustrates a structure of the DC to be performed by an eNB and a gNB that are connected to the EPC. In FIG. 4, solid lines represent connection to the U-planes, and dashed lines represent connection to the C-planes. In FIG. 4, an eNB 223-1 becomes a master base station, and a gNB 224-2 becomes a secondary base station (this DC structure may be referred to as EN-DC). Although FIG. 4 illustrates an example U-Plane connection between the MME unit 204 and the gNB 224-2 through the eNB 223-1, the U-Plane connection may be established directly between the MME unit 204 and the gNB 224-2.

Figure 5:
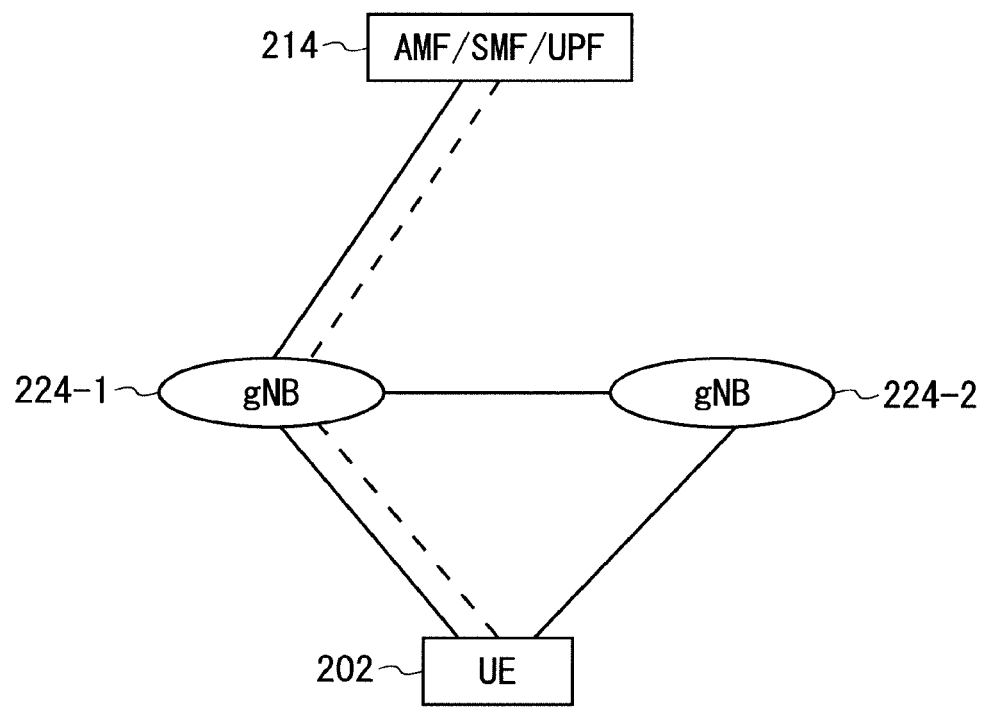
FIG. 5 illustrates a structure of the DC to be performed by gNBs that are connected to the NG core.

FIG. 5 illustrates a structure of the DC to be performed by gNBs that are connected to the NG core. In FIG. 5, solid lines represent connection to the U-planes, and dashed lines represent connection to the C-planes. In FIG. 5, a gNB 224-1 becomes a master base station, and the gNB 224-2 becomes a secondary base station (this DC structure may be referred to as NR-DC). Although FIG. 5 illustrates an example U-Plane connection between the 5GC unit 214 and the gNB 224-2 through the gNB 224-1, the U-Plane connection may be established directly between the 5GC unit 214 and the gNB 224-2.

FIG. 6 illustrates a structure of the DC to be performed by an eNB and a gNB that are connected to the NG core. In FIG. 6, solid lines represent connection to the U-planes, and dashed lines represent connection to the C-planes. In FIG. 6, an eNB 226-1 becomes a master base station, and the gNB 224-2 becomes a secondary base station (this DC structure may be referred to as NG-EN-DC). Although FIG. 6 illustrates an example U-Plane connection between the 5GC unit 214 and the gNB 224-2 through the eNB 226-1, the U-Plane connection may be established directly between the 5GC unit 214 and the gNB 224-2.

Figure 7:
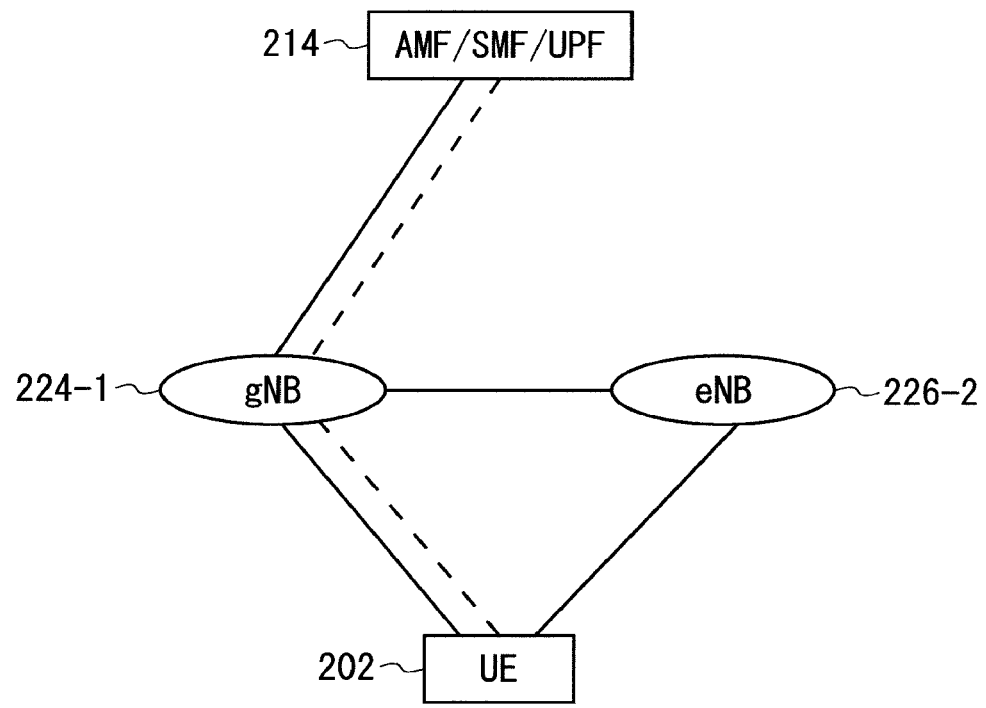
FIG. 7 illustrates a structure of the DC to be performed by the eNB and the gNB that are connected to the NG core.

FIG. 7 illustrates another structure of the DC to be performed by an eNB and a gNB that are connected to the NG core. In FIG. 7, solid lines represent connection to the U-planes, and dashed lines represent connection to the C-planes. In FIG. 7, the gNB 224-1 becomes a master base station, and an eNB 226-2 becomes a secondary base station (this DC structure may be referred to as NE-DC). Although FIG. 7 illustrates an example U-Plane connection between the 5GC unit 214 and the eNB 226-2 through the gNB 224-1, the U-Plane connection may be established directly between the 5GC unit 214 and the eNB 226-2.

Figure 8:
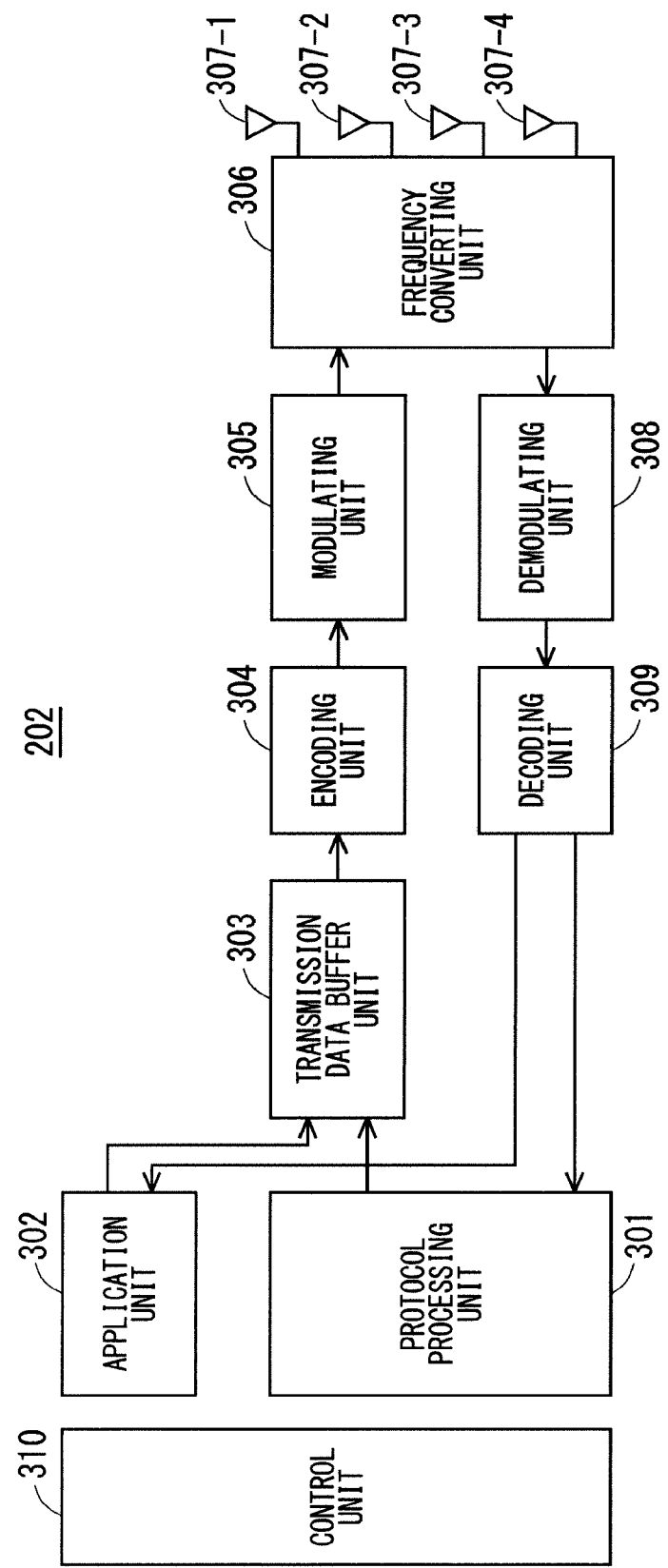
FIG. 8 is a block diagram showing the configuration of a user equipment 202 shown in FIG. 2.

FIG. 8 is a block diagram showing the configuration of the user equipment 202 of FIG. 2. The transmission process of the user equipment 202 shown in FIG. 8 is described. First, a transmission data buffer unit 303 stores the control data from a protocol processing unit 301 and the user data from an application unit 302. The data stored in the transmission data buffer unit 303 is passed to an encoding unit 304, and is subjected to an encoding process such as error correction. There may exist the data output from the transmission data buffer unit 303 directly to a modulating unit 305 without the encoding process. The data encoded by the encoding unit 304 is modulated by the modulating unit 305. The modulating unit 305 may perform precoding in the MIMO. The modulated data is converted into a baseband signal, and the baseband signal is output to a frequency converting unit 306 and is then converted into a radio transmission frequency. After that, transmission signals are transmitted from antennas 307-1 to 307-4 to the base station 203. Although FIG. 8 exemplifies a case where the number of antennas is four, the number of antennas is not limited to four.

The user equipment 202 executes the reception process as follows. The radio signal from the base station 203 is received through each of the antennas 307-1 to 307-4. The received signal is converted from a radio reception frequency into a baseband signal by the frequency converting unit 306 and is then demodulated by a demodulating unit 308. The demodulating unit 308 may calculate a weight and perform a multiplication operation. The demodulated data is passed to a decoding unit 309, and is subjected to a decoding process such as error correction. Among the pieces of decoded data, the control data is passed to the protocol processing unit 301, and the user data is passed to the application unit 302. A series of processes by the user equipment 202 is controlled by a control unit 310. This means that, though not shown in FIG. 8, the control unit 310 is connected to the individual units 301 to 309. In FIG. 8, the number of antennas for transmission of the user equipment 202 may be identical to or different from that for its reception.

Figure 9:
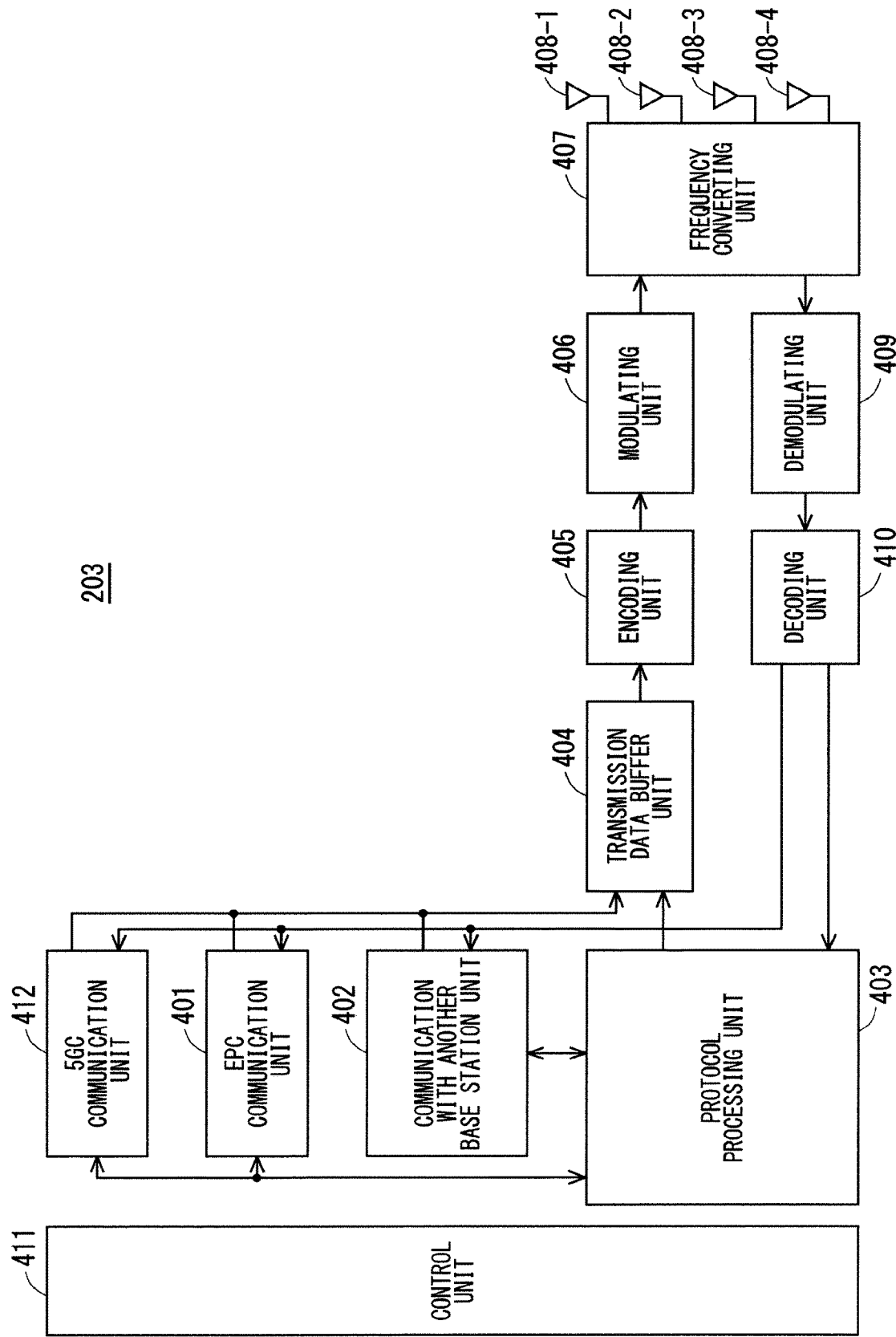
FIG. 9 is a block diagram showing the configuration of a base station 203 shown in FIG. 2.

FIG. 9 is a block diagram showing the configuration of the base station 203 of FIG. 2. The transmission process of the base station 203 shown in FIG. 9 is described. An EPC communication unit 401 performs data transmission and reception between the base station 203 and the EPC (such as the MME unit 204) and the like. A 5GC communication unit 412 transmits and receives data between the base station 203 and the 5GC (e.g., the 5GC unit 214). A communication with another base station unit 402 performs data transmission and reception to and from another base station. The EPC communication unit 401, the 5GC communication unit 412, and the communication with another base station unit 402 each transmit and receive information to and from a protocol processing unit 403. The control data from the protocol processing unit 403, and the user data and the control data from the EPC communication unit 401, the 5GC communication unit 412, and the communication with another base station unit 402 are stored in a transmission data buffer unit 404.

The data stored in the transmission data buffer unit 404 is passed to an encoding unit 405, and then an encoding process such as error correction is performed for the data. There may exist the data output from the transmission data buffer unit 404 directly to a modulating unit 406 without the encoding process. The encoded data is modulated by the modulating unit 406. The modulating unit 406 may perform precoding in the MIMO. The modulated data is converted into a baseband signal, and the baseband signal is output to a frequency converting unit 407 and is then converted into a radio transmission frequency. After that, transmission signals are transmitted from antennas 408-1 to 408-4 to one or a plurality of user equipments 202. Although FIG. 9 exemplifies a case where the number of antennas is four, the number of antennas is not limited to four.

The reception process of the base station 203 is executed as follows. A radio signal from one or a plurality of user equipments 202 is received through the antenna 408. The received signal is converted from a radio reception frequency into a baseband signal by the frequency converting unit 407, and is then demodulated by a demodulating unit 409. The demodulated data is passed to a decoding unit 410 and then subject to a decoding process such as error correction. Among the pieces of decoded data, the control data is passed to the protocol processing unit 403, the 5GC communication unit 412, the EPC communication unit 401, or the communication with another base station unit 402, and the user data is passed to the 5GC communication unit 412, the EPC communication unit 401 and the communication with another base station unit 402. A series of processes by the base station 203 is controlled by a control unit 411. This means that, though not shown in FIG. 4, the control unit 411 is connected to the individual units 401 to 410. In FIG. 9, the number of antennas for transmission of the base station 203 may be identical to or different from that for its reception.

Although FIG. 9 is the block diagram illustrating the configuration of the base station 203, the base station 213 may have the same configuration. Furthermore, in FIGS. 8 and 9, the number of antennas of the user equipment 202 may be identical to or different from that of the base station 203.

Figure 10:
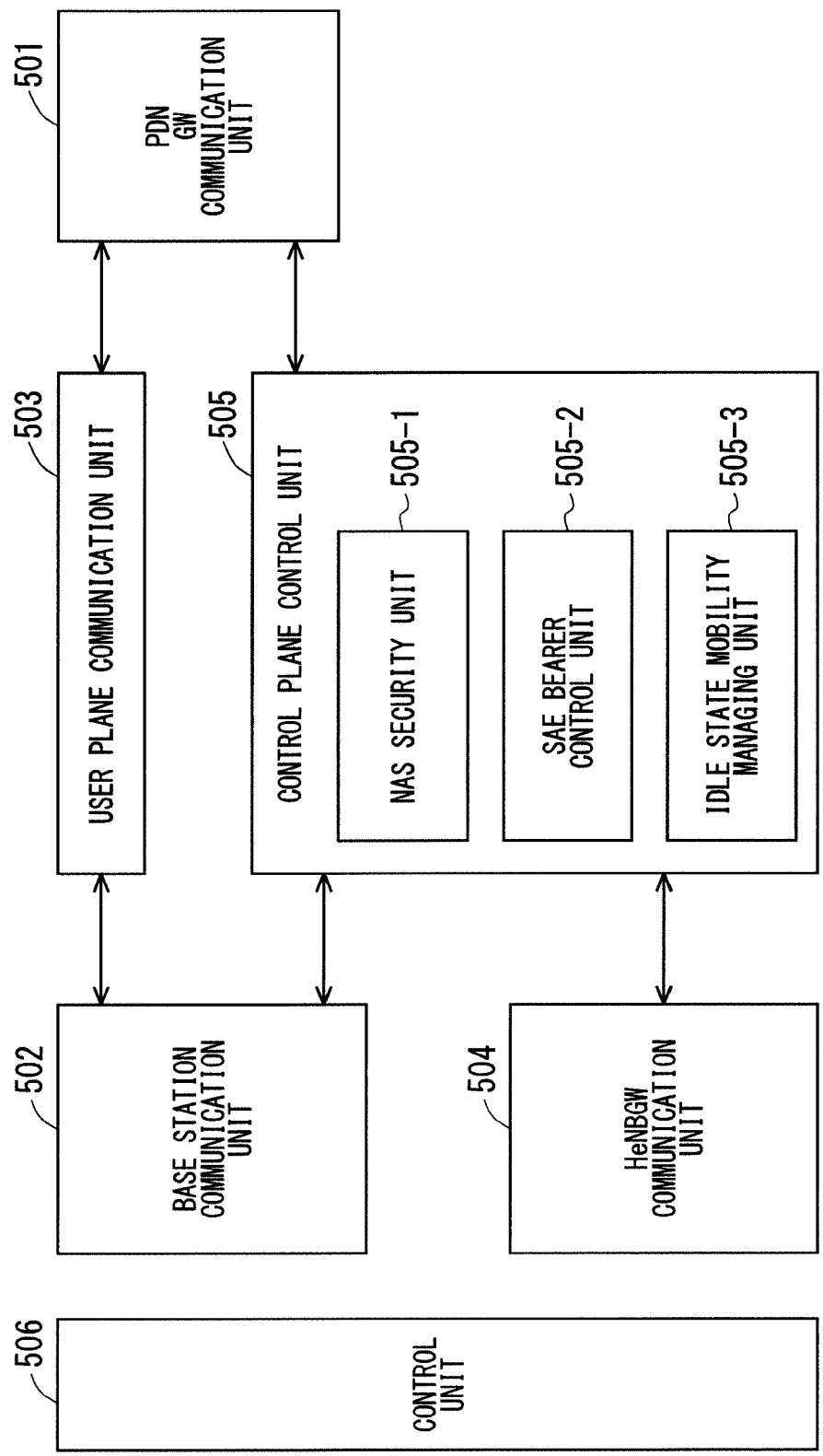
FIG. 10 is a block diagram showing the configuration of an MME.

FIG. 10 is a block diagram showing the configuration of the MME. FIG. 10 shows the configuration of an MME 204a included in the MME unit 204 shown in FIG. 2 described above. A PDN GW communication unit 501 performs data transmission and reception between the MME 204a and the PDN GW. A base station communication unit 502 performs data transmission and reception between the MME 204a and the base station 203 by means of the S1 interface. In a case where the data received from the PDN GW is user data, the user data is passed from the PDN GW communication unit 501 to the base station communication unit 502 via a user plane communication unit 503 and is then transmitted to one or a plurality of base stations 203. In a case where the data received from the base station 203 is user data, the user data is passed from the base station communication unit 502 to the PDN GW communication unit 501 via the user plane communication unit 503 and is then transmitted to the PDN GW.

In a case where the data received from the PDN GW is control data, the control data is passed from the PDN GW communication unit 501 to a control plane control unit 505. In a case where the data received from the base station 203 is control data, the control data is passed from the base station communication unit 502 to the control plane control unit 505.

The control plane control unit 505 includes a NAS security unit 505-1, an SAE bearer control unit 505-2, and an idle state mobility managing unit 505-3, and performs an overall process for the control plane (hereinafter also referred to as a "C-plane"). The NAS security unit 505-1 provides, for example, security of a non-access stratum (NAS) message. The SAE bearer control unit 505-2 manages, for example, a system architecture evolution (SAE) bearer. The idle state mobility managing unit 505-3 performs, for example, mobility management of an idle state (LTE-IDLE state which is merely referred to as idle as well), generation and control of a paging signal in the idle state, addition, deletion, update, and search of a tracking area of one or a plurality of user equipments 202 being served thereby, and tracking area list management.

The MME 204a distributes a paging signal to one or a plurality of base stations 203. In addition, the MME 204a performs mobility control of an idle state. When the user equipment is in the idle state and an active state, the MME 204a manages a list of tracking areas. The MME 204a begins a paging protocol by transmitting a paging message to the cell belonging to a tracking area in which the UE is registered. The idle state mobility managing unit 505-3 may manage the CSG of the eNBs 207 to be connected to the MME 204a, CSG IDs, and a whitelist.

Figure 11:
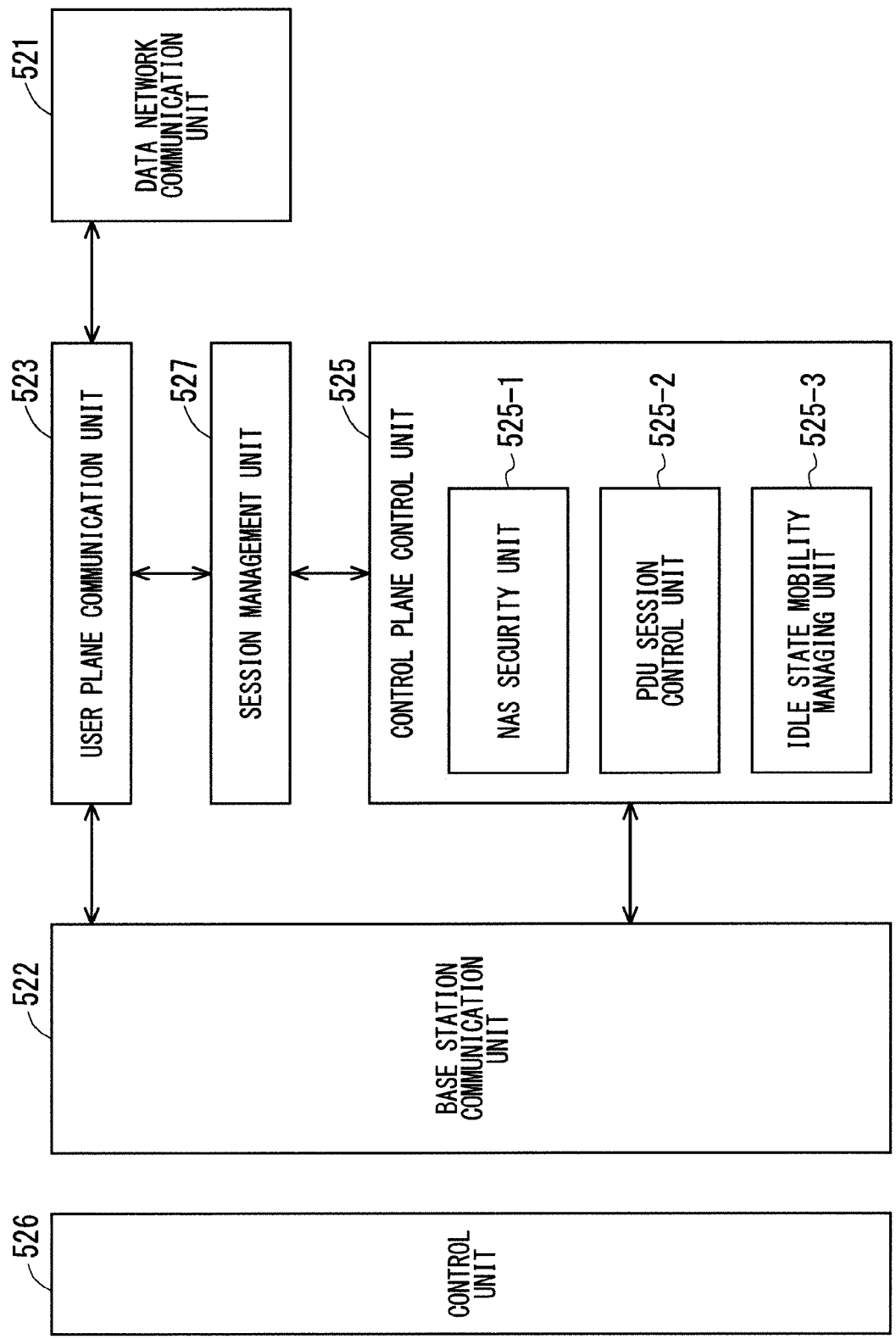
FIG. 11 is a block diagram illustrating a configuration of the 5GC.

FIG. 11 is a block diagram illustrating a configuration of the 5GC. FIG. 11 illustrates a configuration of the 5GC unit 214 in FIG. 3. FIG. 11 illustrates a case where the 5GC unit 214 in FIG. 5 includes configurations of the AMF, the SMF, and the UPF. A data network communication unit 521 transmits and receives data between the 5GC unit 214 and a data network. A base station communication unit 522 transmits and receives data via the S1 interface between the 5GC unit 214 and the base station 203 and/or via the NG interface between the 5GC unit 214 and the base station 213. When the data received through the data network is user data, the data network communication unit 521 passes the user data to the base station communication unit 522 through a user plane communication unit 523 to transmit the user data to one or more base stations, specifically, the base station 203 and/or the base station 213. When the data received from the base station 203 and/or the base station 213 is user data, the base station communication unit 522 passes the user data to the data network communication unit 521 through the user plane communication unit 523 to transmit the user data to the data network.

When the data received from the data network is control data, the data network communication unit 521 passes the control data to a session management unit 527 via the user plane communication unit 523. The session management unit 527 passes the control data to a control plane control unit 525. When the data received from the base station 203 and/or the base station 213 is control data, the base station communication unit 522 passes the control data to the control plane control unit 525. The control plane control unit 525 passes the control data to the session management unit 527.

The control plane control unit 525 includes, for example, a NAS security unit and performs overall processes on the control planes (may be hereinafter referred to as C-Planes). The NAS security unit 525-1, for example, provides security for a Non-Access Stratum (NAS) message. The PDU session control unit 525-2, for example, manages a PDU session between the user equipment 202 and the 5GC unit 214. The idle state mobility managing unit 525-3, for example, manages mobility of an idle state (an RRC_IDLE state or simply referred to as idle), generates and controls paging signals in the idle state, and adds, deletes, updates, and searches for tracking areas of one or more user equipments 202 being served thereby, and manages a tracking area list.

The 5GC unit 214 distributes the paging signals to one or more base stations, specifically, the base station 203 and/or the base station 213. Furthermore, the 5GC unit 214 controls mobility of the idle state. The 5GC unit 214 manages the tracking area list when a user equipment is in an idle state, an inactive state, and an active state. The 5GC unit 214 starts a paging protocol by transmitting a paging message to a cell belonging to a tracking area in which the UE is registered.

Figure 12:
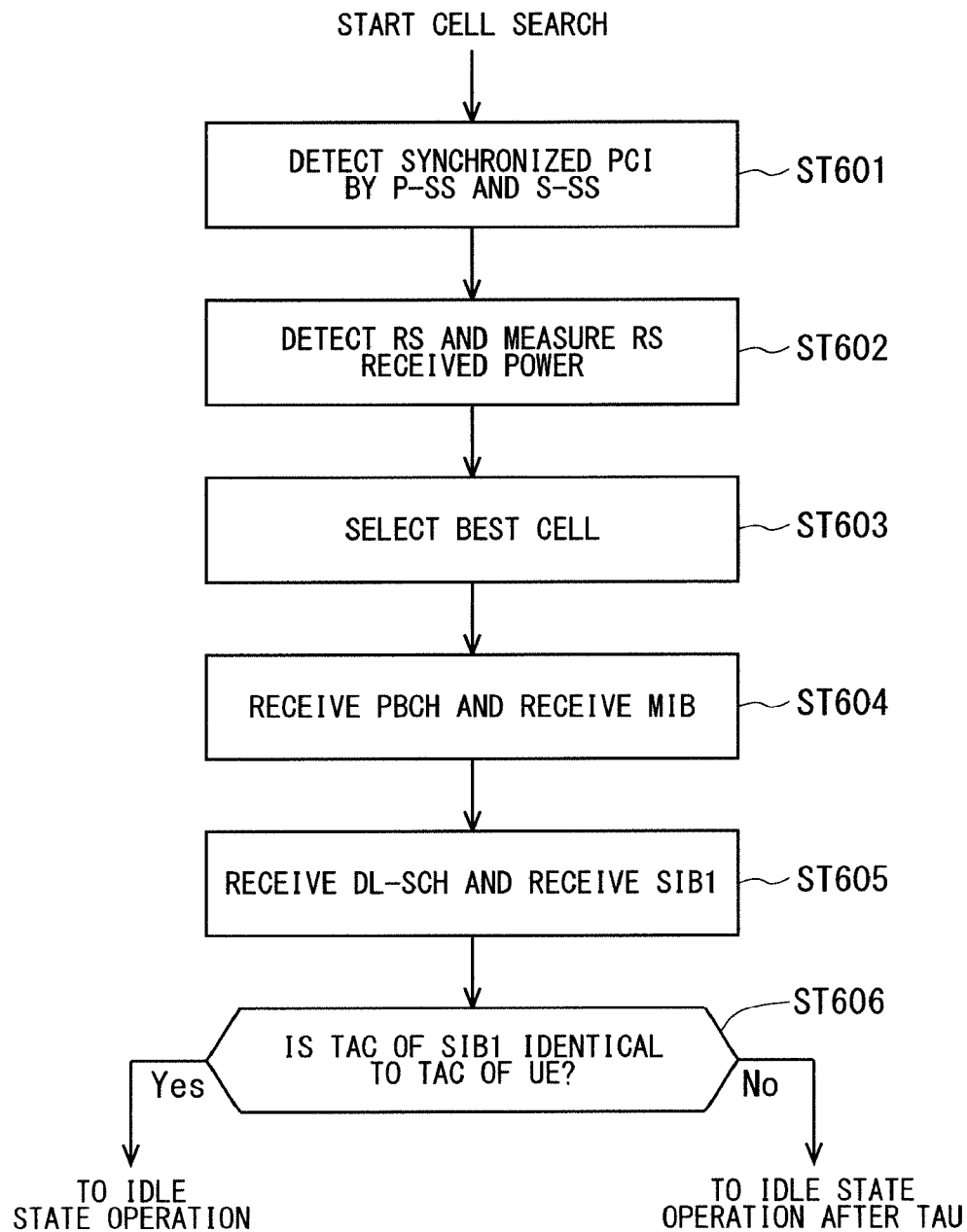
FIG. 12 is a flowchart showing an outline from a cell search to an idle state operation performed by a communication terminal (UE) in LTE communication system.

An example of a cell search method in a mobile communication system is described next. FIG. 12 is a flowchart showing an outline from a cell search to an idle state operation performed by a communication terminal (UE) in the LTE communication system. When starting a cell search, in Step ST601, the communication terminal synchronizes slot timing and frame timing by a primary synchronization signal (P-SS) and a secondary synchronization signal (S-SS) transmitted from a neighbor base station.

The P-SS and S-SS are collectively referred to as a synchronization signal (SS). Synchronization codes, which correspond one-to-one to PCIs assigned per cell, are assigned to the synchronization signals (SSs). The number of PCIs is currently studied in 504 ways. The 504 ways of PCIs are used for synchronization, and the PCIs of the synchronized cells are detected (specified).

In Step ST602, next, the user equipment detects a cell-specific reference signal (CRS) being a reference signal (RS) transmitted from the base station per cell and measures the reference signal received power (RSRP). The codes corresponding one-to-one to the PCIs are used for the reference signal RS. Separation from another cell is enabled by correlation using the code. The code for RS of the cell is calculated from the PCI specified in Step ST601, so that the RS can be detected and the RS received power can be measured.

In Step ST603, next, the user equipment selects the cell having the best RS received quality, for example, the cell having the highest RS received power, that is, the best cell, from one or more cells that have been detected up to Step ST602.

In Step ST604, next, the user equipment receives the PBCH of the best cell and obtains the BCCH that is the broadcast information. A master information block (MIB) containing the cell configuration information is mapped to the BCCH over the PBCH. Accordingly, the MIB is obtained by obtaining the BCCH through reception of the PBCH. Examples of the MIB information include the downlink (DL) system bandwidth (also referred to as a transmission bandwidth configuration (dl-bandwidth)), the number of transmission antennas, and a system frame number (SFN).

In Step ST605, next, the user equipment receives the DL-SCH of the cell based on the cell configuration information of the MIB, to thereby obtain a system information block (SIB) 1 of the broadcast information BCCH. The SIB1 contains the information about the access to the cell, information about cell selection, and scheduling information on another SIB (SIBk; k is an integer equal to or greater than two). In addition, the SIB1 contains a tracking area code (TAC).

In Step ST606, next, the communication terminal compares the TAC of the SIB1 received in Step ST605 with the TAC portion of a tracking area identity (TAI) in the tracking area list that has already been possessed by the communication terminal. The tracking area list is also referred to as a TAI list. TAI is the identification information for identifying tracking areas and is composed of a mobile country code (MCC), a mobile network code (MNC), and a tracking area code (TAC). MCC is a country code. MNC is a network code. TAC is the code number of a tracking area.

If the result of the comparison of Step ST606 shows that the TAC received in Step ST605 is identical to the TAC included in the tracking area list, the user equipment enters an idle state operation in the cell. If the comparison shows that the TAC received in Step ST605 is not included in the tracking area list, the communication terminal requires a core network (EPC) including MME to change a tracking area through the cell for performing tracking area update (TAU).

Although FIG. 12 exemplifies the operations from the cell search to the idle state in LTE, the best beam may be selected in NR in addition to the best cell in Step ST603. In NR, information on a beam, for example, an identifier of the beam may be obtained in Step ST604. Furthermore, scheduling information on the Remaining Minimum SI (RMSI) in NR may be obtained in Step ST604. The RMSI in NR may be obtained in Step ST605.

The device configuring a core network (hereinafter, also referred to as a "core-network-side device") updates the tracking area list based on an identification number (such as UE-ID) of a communication terminal transmitted from the communication terminal together with a TAU request signal. The core-network-side device transmits the updated tracking area list to the communication terminal. The communication terminal rewrites (updates) the TAC list of the communication terminal based on the received tracking area list. After that, the communication terminal enters the idle state operation in the cell.

Widespread use of smartphones and tablet terminal devices explosively increases traffic in cellular radio communications, causing a fear of insufficient radio resources all over the world. To increase spectral efficiency, thus, it is studied to downsize cells for further spatial separation.

In the conventional configuration of cells, the cell configured by an eNB has a relatively-wide-range coverage. Conventionally, cells are configured such that relatively-wide-range coverages of a plurality of cells configured by a plurality of macro eNBs cover a certain area.

When cells are downsized, the cell configured by an eNB has a narrow-range coverage compared with the coverage of a cell configured by a conventional eNB. Thus, in order to cover a certain area as in the conventional case, a larger number of downsized eNBs than the conventional eNBs are required.

In the description below, a "macro cell" refers to a cell having a relatively wide coverage, such as a cell configured by a conventional eNB, and a "macro eNB" refers to an eNB configuring a macro cell. A "small cell" refers to a cell having a relatively narrow coverage, such as a downsized cell, and a "small eNB" refers to an eNB configuring a small cell.

The macro eNB may be, for example, a "wide area base station" described in Non-Patent Document 7.

The small eNB may be, for example, a low power node, local area node, or hotspot. Alternatively, the small eNB may be a pico eNB configuring a pico cell, a femto eNB configuring a femto cell, HeNB, remote radio head (RRH), remote radio unit (RRU), remote radio equipment (RRE), or relay node (RN). Still alternatively, the small eNB may be a "local area base station" or "home base station" described in Non-Patent Document 7.

FIG. 13 illustrates an example structure of a cell in NR. In the cell in NR, a narrow beam is formed and transmitted in a changed direction. In the example of FIG. 13, a base station 750 performs transmission and reception with a user equipment via a beam 751-1 at a certain time. The base station 750 performs transmission and reception with the user equipment via a beam 751-2 at another time. Similarly, the base station 750 performs transmission and reception with the user equipment via one or more of beams 751-3 to 751-8. As such, the base station 750 configures a cell with a wide range.

Although FIG. 13 exemplifies that the number of beams to be used by the base station 750 is eight, the number of beams may be different from eight. Although FIG. 13 also exemplifies that the number of beams to be simultaneously used by the base station 750 is one, the number of such beams may be two or more.

In connection between the UE and the NR base station (which may be hereinafter referred to as a gNB), the UE may start random access processing by using a random access order from the gNB. As the order, for example, the PDCCH may be used. The UE may start the random access processing for the gNB by using a PDCCH order from the gNB. The PDCCH order may include information related to timing (PRACH transmission occasion (PRACH occasion)) at which the UE may transmit the PRACH to the gNB. The information may be, for example, an identifier of the SS block. The information related to the association between the SS block and the PRACH transmission occasion may be broadcast from the gNB to the UE in advance or may be notified individually. The UE may derive the PRACH transmission occasion by using the information related to the association and the information related to the PRACH transmission occasion.

For the time from when the UE receives the PDCCH order from the gNB to when the UE transmits the PRACH, minimum time may be provided. The minimum time may be, for example, determined by using time necessary for PUSCH generation processing (which may be hereinafter referred to as N_T2), uplink BWP switching time (which may be hereinafter referred to as Δ_BWPswitching), and a predetermined delay amount (which may be hereinafter referred to as Δ_Delay), which is based on frequency used in communication between the UE and the gNB. For example, the minimum time may be the sum of N_T2, Δ_BWPswitching, and Δ_Delay. The UE may perform PRACH transmission in the first PRACH transmission occasion after elapse of the minimum time after reception of the PDCCH order. The gNB may receive the PRACH from the UE in the first PRACH transmission occasion after elapse of the minimum time.

Further, in connection between the UE and the gNB, a plurality of transmission reception points (TRPs) under the gNB may be used. Note that the TRP may be referred to as a transmitter-receiver. The plurality of UEs described above may be asynchronous with each other. Specifically, subframe boundaries of signals transmitted and received by each TRP may be different from each other. The gNB may switch transmission and reception destination TRPs under the gNB for the UEs under the gNB. The switch of the transmission and reception destination TRPs described above may be performed by using an order from the gNB. For example, using the fact that communication quality with another TRP under the same gNB has further enhanced than a currently connected TRP, the UE may switch a connection destination TRP to the TRP with the enhanced communication quality described above.

In the description above, a problem described below is caused. Specifically, the minimum time described above does not consider processing along with TRP switch, and thus the UE cannot transmit the PRACH to a switch destination TRP in the earliest PRACH transmission occasion described above. As a result, there is a problem that TRP switch processing in the UE cannot be promptly executed.

A solution to the problem described above will be disclosed below.

Time (which may be hereinafter referred to as Δ_SSB) necessary for synchronization with a TRP after switch is added to minimum switch time for the UE to transmit the PRACH after PDCCH order reception. The time necessary for synchronization may be, for example, time (for example, four symbols) corresponding to the SS block. As another example, the time necessary for synchronization may be time necessary for synchronization establishment processing, for example, time necessary for demodulation of the SS block, may be time necessary for synchronization code detection processing using demodulation results, or may be total time required for the demodulation described above and synchronization code detection processing. With this, for example, the UE can transmit the PRACH to the gNB in the PRACH transmission occasion that occurs immediately after execution of the synchronization establishment processing with the SS block. As a result, the UE can promptly execute the TRP switch.

The time necessary for synchronization in the UE may be different for each subcarrier spacing that the UE uses for transmission and reception to and from the gNB, or may be the same. For example, the time necessary for demodulation of the SS block may be different for each subcarrier spacing, or may be the same. The time necessary for the synchronization code detection processing using demodulation results may be different for each subcarrier spacing, or may be the same. This can prevent the time necessary for synchronization from being unnecessarily secured long when, for example, the subcarrier spacing is large, that is, when the symbol length is short. As a result, the PRACH transmission in the UE can be promptly executed.

As another example of addition to the minimum switch time, time (which may be hereinafter referred to as Δ_beamswitch) necessary for the UE to switch beams used for uplink transmission and/or downlink reception may be added. With this, for example, when switch of beams used by the UE also occurs along with the TRP switch as well, the UE can execute the switch of beams within the minimum time after the addition.

As another example of addition to the minimum switch time, both of Δ_SSB and Δ_beamswitch may be added. With this, for example, when switch of beams used by the UE also occurs along with the TRP switch as well, the UE can execute the switch of beams within the minimum time after addition while performing the synchronization establishment processing using the SS block.

The gNB may use, as new minimum switch time, a value obtained by adding Δ_SSB and/or Δ_beamswitch described above to the minimum switch time for transmitting the PRACH after PDCCH order reception. The gNB may start reception of the PRACH from the UE in the PRACH transmission occasion after elapse of the new minimum switch time from the PDCCH order transmission time point. The minimum switch time used in the UE and the minimum switch time used in the gNB may be set to be the same. This can prevent inconsistency of recognition of PRACH transmission timing between the UE and the gNB, for example. As a result, reliability in the communication system can be enhanced.

The UE may notify the gNB of the information necessary for the addition described above in advance. For the notification of the information, for example, RRC signaling may be used, MAC signaling may be used, or L1/L2 signaling may be used. The gNB may request the information necessary for the addition described above from the UE. In the request, for example, RRC signaling may be used, MAC signaling may be used, or L1/L2 signaling may be used. The information necessary for the addition described above may be, for example, information of the time necessary for the synchronization establishment processing, may be information of the time necessary for the beam switch in the UE, may be a combination of both the pieces of information described above, or may be information of time obtained by adding both the times described above.

The UE may be provided with a function of measuring the new minimum switch time described above, for example, a timer that measures the time. The same may hold true for the gNB as well. This can prevent occurrence of malfunction in the processing from reception of the PDCCH order to transmission of the PRACH in the UE, for example.

The UE may notify the gNB of the information necessary for the addition described above by including the information in UE capability. With this, for example, the UE can notify the gNB of the information along with other UE capability. As a result, complexity in the communication system can be avoided. As another example, the UE may perform notification of the information by using RRC signaling. With this, for example, the UE can notify the gNB of a large amount of information. As another example, the UE may perform notification of the information by using MAC signaling. With this, for example, the UE can promptly notify the gNB of the information. As another example, the UE may perform notification of the information by using L1/L2 signaling. With this, for example, the UE can further promptly notify the gNB of the information.

The UE may derive the PRACH transmission occasion after connection destination TRP switch, by using frame timing in the TRP after switch. In the information related to the association between the SS block identifier and the PRACH transmission occasion broadcast from the gNB, the PRACH transmission timing may be timing with the frame timing in the TRP from which the SS block is transmitted being used as a reference. With this, for example, when a backhaul delay between the gNB and the TRP is either increased or reduced before or after the TRP switch, the UE can transmit the PRACH in the PRACH transmission occasion in the TRP after switch.

Figure 14:
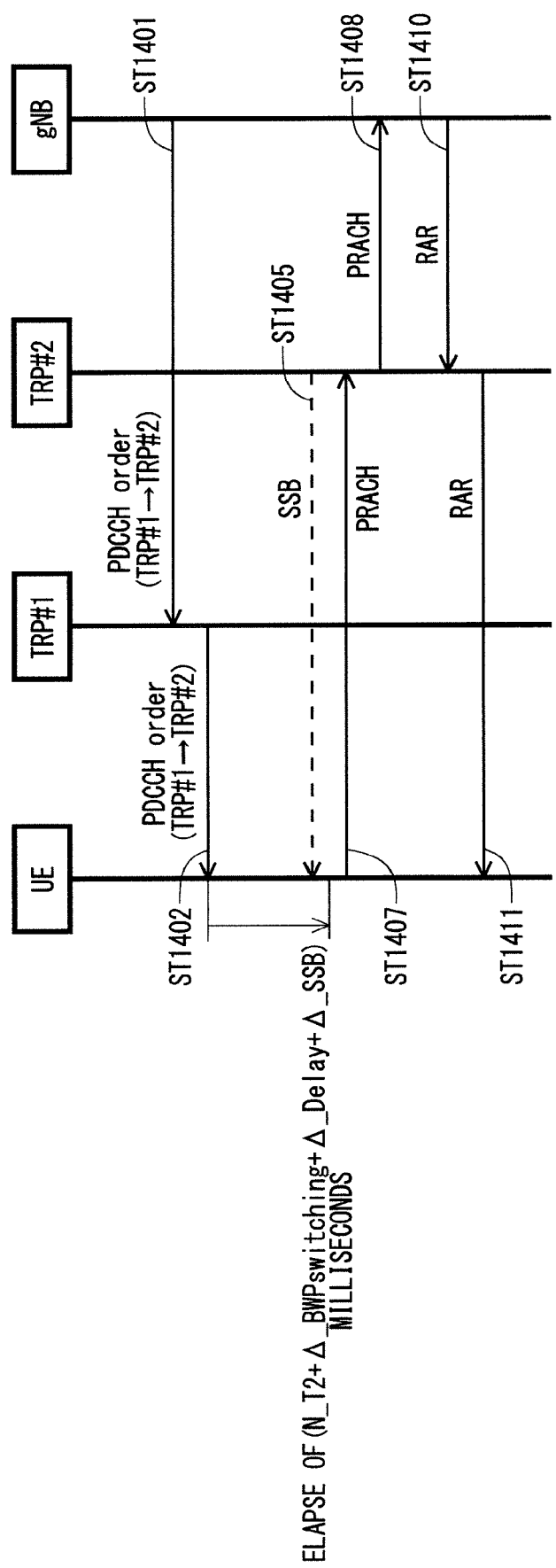
FIG. 14 is a sequence diagram illustrating operation in which the UE transmits a PRACH after elapse of predetermined time from reception of a PDCCH order according to a first embodiment.

FIG. 14 is a sequence diagram illustrating an example of operation in which the UE transmits the PRACH by switching connection destination TRPs after PDCCH order reception and receives a random access response (RAR). The example illustrated in FIG. 14 assumes that the TRP connected by the UE is switched from TRP #1 to TRP #2. Further, the example illustrated in FIG. 14 assumes that the minimum time for the UE from PDCCH order reception to PRACH transmission is a value obtained by adding Δ_SSB to the sum of N_T2, Δ_BWPswitching, and Δ_Delay.

In Steps ST1401 and ST1402 illustrated in FIG. 14, the gNB transmits the PDCCH order to the UE via TRP #1. Step ST1401 illustrates the order from the gNB to TRP #1, and further, Step ST1402 illustrates the order from TRP #1 to the UE. In the order, information indicating switch from TRP #1 to TRP #2 is included. In the order, information related to an RA preamble used by the UE in the PRACH may be included, information related to the PRACH transmission occasion, for example, an identifier of the SS block that should be received by the UE, may be included, or both of the above may be included.

When the UE receives the PDCCH order in Step ST1402, the UE starts the timer that measures the minimum time. The UE may receive the SS block transmitted as Step ST1405 before the timer expires. When the UE receives the SS block in Step ST1405, the UE establishes downlink synchronization with TRP #2. The SS block reception step ST1405 by the UE may be performed after the timer expires. The UE transmits the PRACH to TRP #2 in the first PRACH transmission occasion after the time being the sum of N_T2, Δ_BWPswitching, Δ_Delay, and Δ_SSB has elapsed from the PDCCH order reception and the downlink synchronization with TRP #2 has established (Step ST1407). In Step ST1408, TRP #2 transmits, to the gNB, the PRACH received from the UE. The RA preamble in the PRACH transmission may be the RA preamble included in Step ST1402, or may be different.

In Steps ST1410 and ST1411 illustrated in FIG. 14, the gNB notifies the UE of a random access response via TRP #2. Step ST1410 illustrates random access response notification from the gNB to TRP #2, and further, Step ST1411 illustrates random access response notification from TRP #2 to the UE. The UE establishes uplink synchronization with TRP #2 by using the response.

FIG. 14 has illustrated an example in which Δ_SSB is added to the sum of N_T2, Δ_BWPswitching, and Δ_Delay as the minimum time. As the minimum time, Δ_beamswitch may be added instead of Δ_SSB, or the sum of Δ_SSB and Δ_beamswitch may be added. With this, for example, even after the beam switch in the UE, the UE can promptly transmit the PRACH to TRP #2.

Another solution will be disclosed. When the TRP switch occurs, the PDCCH order may not be performed from the gNB to the UE. For example, in switch to an asynchronous TRP, the PDCCH order from the gNB to the UE may not be performed. In the switch to an asynchronous TRP, a random access order using MAC signaling may be performed or a random access order using RRC signaling may be performed from the gNB to the UE. When the TRP before and after switch is synchronous, the PDCCH order from the gNB to the UE may be performed. This can prevent inconsistency of recognition of PRACH transmission timing between the gNB and the UE, for example. As a result, malfunction in the communication system can be prevented.

The UE may discard the PDCCH order for ordering switch to an asynchronous TRP. The UE may notify the gNB of information indicating that the UE has discarded the PDCCH order. The notification may be, for example, performed via the TRP before switch. For the notification, for example, L1/L2 signaling may be used, MAC signaling may be used, or RRC signaling may be used. As another example, the UE need not notify the gNB of information indicating that the UE has discarded the PDCCH order. For example, the UE may start random access processing for TRP #1. The random access processing may be, for example, contention-free random access processing, or may be contention-based random access processing.

The UE may determine whether the TRP after switch is synchronous or asynchronous by using notification from the gNB. The gNB may notify the UE of information related to synchronization/asynchronization with the TRP after switch and the TRP before switch. The information may be, for example, an indicator indicating whether or not synchronization is established, or may be information related to a difference of a backhaul delay between the gNB and the TRP before and after switch. As another example, the gNB may perform notification of information related to synchronization/asynchronization between TRPs under the gNB, regarding the UE. The information may be information similar to the above. For the notification from the gNB to the UE, RRC signaling may be used, MAC signaling may be used, or L1/L2 signaling may be used.

Figure 15:
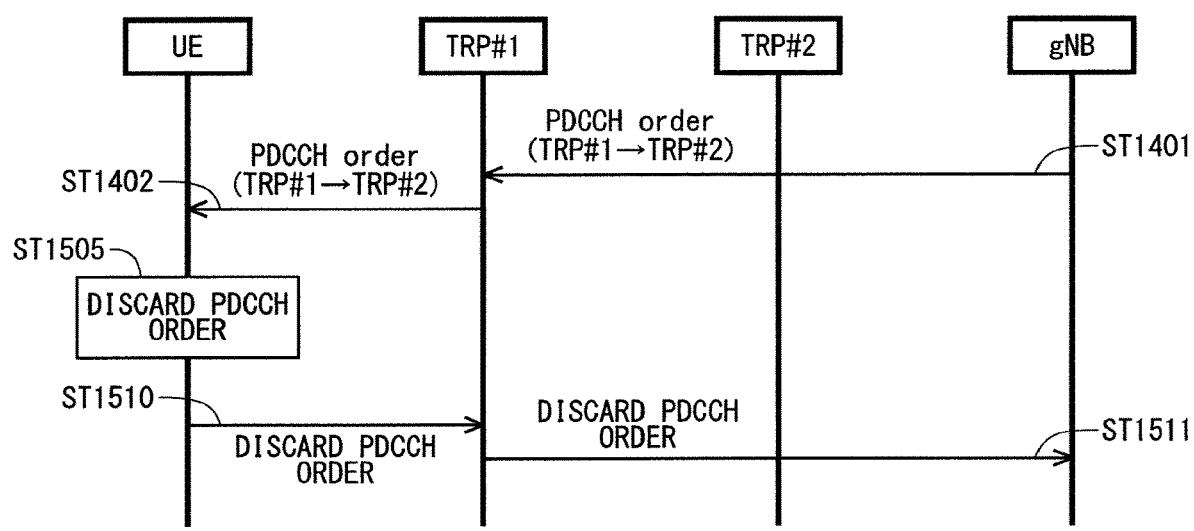
FIG. 15 is a sequence diagram illustrating operation in which the UE discards the PDCCH order according to the first embodiment.

FIG. 15 is a sequence diagram illustrating operation in which the UE discards the PDCCH order for ordering switch to an asynchronous TRP. The example illustrated in FIG. 15 illustrates a case in which the gNB orders the UE to switch from TRP #1 to TRP #2 being asynchronous with TRP #1. Further, the example illustrated in FIG. 15 illustrates a case in which the UE notifies the gNB that the UE has discarded the PDCCH order. In FIG. 15, the parts common to FIG. 14 are denoted by the same numbers, and common description will be omitted.

Steps ST1401 and ST1402 in FIG. 15 are similar to those of FIG. 14.

In Step ST1505 illustrated in FIG. 15, the UE discards the PDCCH order received in Step ST1402. In Steps ST1510 and ST1511, the UE notifies the gNB that the UE has discarded the PDCCH order via TRP #1. Step ST1510 illustrates the notification from the UE to TRP #1, and further, Step ST1511 illustrates the notification from TRP #1 to the gNB. The notification may be performed using L1/L2 signaling, may be performed using MAC signaling, or may be performed using RRC signaling.

The example illustrated in FIG. 15 has illustrated a case in which the UE notifies the gNB that the UE has discarded the PDCCH order in Steps ST1510 and ST1511. However, the notification need not be performed. With this, for example, a signaling amount between the UE and the gNB can be reduced.

The first embodiment has disclosed that, regarding TRP switch, time necessary for synchronization with the TRP after switch is added to the minimum switch time for transmitting the PRACH after PDCCH order reception in the UE. A similar method may be applied to addition of a TRP to be connected. With this, for example, the UE can promptly execute connection to a TRP to be added.

According to the first embodiment, the UE can transmit the PRACH to a switch destination TRP in the earliest PRACH transmission occasion. As a result, TRP switch processing in the UE can be promptly executed.

Second Embodiment

In downlink data reception, the gNB may notify the UE of the number of slots from downlink data reception by the UE to a HARQ response from the UE by using L1/L2 signaling. The gNB may notify the UE of candidates of the number of slots in advance. For the notification of the candidates, for example, RRC signaling may be used. The gNB may select the number of slots from downlink data reception by the UE to a HARQ response from the UE out of the candidates and notify the UE. For the notification of the selected number of slots, for example, L1/L2 signaling may be used. The number of slots may be notified by being included in DCI including downlink scheduling information from the gNB to the UE.

When the method described above is applied before and after TRP switch, a problem described below is caused. For example, due to switch to an asynchronous TRP, a backhaul delay amount between the gNB and the TRP is changed. With this, between the UE and the gNB, time from downlink data reception to a HARQ response varies. As a result, a delay of downlink data transmission and reception before and after TRP switch varies.

A solution to the problem described above will be disclosed below.

Along with TRP switch, values being the candidates of the number of slots from downlink data reception by the UE to a HARQ response from the UE are switched. The gNB may notify the UE of the values of the candidates. The notification may be performed in advance before a TRP switch order from the gNB to the UE, or may be included in the switch order. The notification may be performed after the switch order. For the notification, for example, RRC signaling may be used. With this, for example, the gNB can notify the UE of a large amount of information. As another example, MAC signaling may be used. With this, for example, prompt notification is enabled from the gNB to the UE. As another example, L1/L2 signaling may be used. With this, for example, further prompt notification is enabled.

In the notification, a plurality of the methods described above may be combined. For example, one or a plurality of combinations of the values of the candidates may be notified from the gNB to the UE in advance semi-statically (for example, by using RRC signaling), and information indicating which combination out of the notified combinations is to be used may be notified from the gNB to the UE dynamically (for example, by using MAC signaling and/or L1/L2 signaling). With this, for example, the number of slots from downlink data reception by the UE to a HARQ response from the UE can be flexibly controlled while enabling reduction of a signaling amount from the gNB to the UE.

After TRP switch, the UE may switch the candidates of the number of slots from downlink data reception to a HARQ response to the candidates included in the notification and use the candidates. After TRP switch of the UE, the gNB may select the number of slots from downlink data reception to a HARQ response out of the candidates included in the notification and notify the UE. With this, for example, variation of delay in HARQ response notification from the UE to the gNB before and after TRP switch can be reduced.

FIG. 16 is a diagram illustrating switch of the candidates of the number of slots from downlink data reception to a HARQ response along with TRP switch. The example of FIG. 16 assumes that a UE 1603 connected to a gNB 1601 switches from communication using a beam 1610 of a TRP #1 1605 to communication using a beam 1611 of a TRP #2 1607.

In the example of FIG. 16, when the UE 1603 is connected to the TRP #1 1605 by using the beam 1610, values shown in a table 1615 are used as the candidates of the number of slots from downlink data reception to a HARQ response. In the table 1615, k represents the number of slots being the candidates, and index represents an identifier for identifying the candidates.

In the example of FIG. 16, when the connection destination of the UE 1603 is switched to the TRP #2 1607 using the beam 1611, the candidates of the number of slots from downlink data reception to a HARQ response are switched to values shown in a table 1616. The values of the candidates shown in the table 1616 may be notified from the gNB to the UE in advance, or may be notified by being included in the TRP switch order from the gNB to the UE.

The values of k shown in the table 1615 and the table 1616 are merely examples, and the values of k may be different from those shown in the examples of FIG. 16. Further, although the number of indexes is eight, the number of indexes may be other numbers. With this, for example, the gNB can perform flexible scheduling for the UE.

The second embodiment has disclosed switch of values as the candidates of the number of slots from downlink data reception by the UE to a HARQ response from the UE along with TRP switch. A similar method may be applied to addition of a TRP to be connected. For example, along with addition of a TRP to be connected, values of the candidates may be added. For example, values of the candidates after addition may be used in communication with an added TRP, or values of the candidates before addition may be used in communication with a TRP before addition. With this, for example, variation of delay in downlink data transmission and reception between the TRPs before and after addition can be reduced.

The method disclosed in the second embodiment may be applied to transmission of the SRS. The SRS may be, for example, an aperiodic SRS. The method disclosed in the second embodiment may be applied to the number of slots used from when the UE receives an SRS transmission order from the gNB to when the UE transmits the SRS. With this, for example, in SRS transmission from the UE as well, variation of delay in SRS transmission from the UE to the gNB before and after TRP switch can be reduced.

The method disclosed in the second embodiment may be applied to switch of BWPs. For example, candidates of a BWP configuration in the UE may be switched along with TRP switch. The gNB may notify the UE of values of the candidates of the BWP configuration after TRP switch. The notification may be performed in advance before a TRP switch order from the gNB to the UE, or may be included in the switch order. The notification may be performed after the switch order. For the notification, for example, RRC signaling may be used, MAC signaling may be used, or L1/L2 signaling may be used. With this, for example, collision of time and/or frequency resources with another UE along with TRP switch can be prevented.

The BWP configuration described above may be, for example, information related to numerology in each BWP, may be frequency and/or time resources in each BWP, may be information related to a configured grant in each BWP, or may be a combination of the plurality of pieces of information described above. In the BWP configuration described above, other information may be included. For operation of switch of the candidates of the BWP configuration described above, the table 1615 in FIG. 16 may be applied, with index thereof being changed to BWP identifier and k to BWP configuration. The same as the table 1615 may hold true for the table 1616 in FIG. 16 as well.

According to the second embodiment, variation of time from downlink data reception to a HARQ response can be reduced even before and after TRP switch. As a result, variation of delay in downlink data transmission and reception can be reduced before and after TRP switch.

Third Embodiment

The UE may transmit the SRS of a plurality of symbols in one subframe. The SRS transmission may be used in LTE. The base station may perform configuration of transmitting a plurality of SRS symbols to the UE. The UE may transmit a plurality of SRS symbols by using the configuration.

In the description above, a problem described below is caused. Specifically, in a conventional SRS configuration (see Non-Patent Document 22) disclosed in Non-Patent Document 22, only a configuration of transmitting the SRS using only one symbol at the end of a subframe is performed. As a result, the base station cannot configure transmission of a plurality of SRS symbols in one subframe for the UE, and further, the UE cannot transmit a plurality of SRS symbols in one subframe.

A method for solving the problem described above will be disclosed.

In SRS configuration, information related to SRS transmission symbols is added. In the information, information related to a start symbol of the symbols used for transmission of the SRS may be included, or information related to the number of symbols used for transmission of the SRS may be included. Information related to an end symbol of the symbols for transmission of the SRS may or may not be included. As another example, information of symbol numbers used for transmission of the SRS may be included. The information of the symbol numbers used for transmission of the SRS may have a bitmap format, for example. In the bitmap, each bit and the symbol number in one subframe may be associated with each other.

As another example, information related to a slot used for transmission of SRS may be included. The information related to the SRS transmission symbols may be information related to symbols in the slot that are used for transmission of the SRS, for example, information indicating the first half slot or the second half slot. With this, for example, when the SRS is transmitted in only the half of one subframe, an information amount of the information related to the SRS transmission symbols can be reduced.

Another solution will be disclosed. The SRS configuration can be configured in the unit of one slot, that is, the unit of half the time of one subframe. In the description above, one subframe being a configuration unit in an SRS transmission period and/or an SRS transmission offset in an SRS configuration identifier, for example, srs-ConfigIndex in Non-Patent Document 22, may be changed to one slot to be applied. With this, for example, complexity of communication system design related to the configuration from the base station to the UE can be avoided.

According to the third embodiment, the UE can transmit the SRS of a plurality of symbols in one subframe. As a result, for example, sounding can be promptly executed also for the UE at a cell end.

The embodiments and the modifications are mere exemplifications of the present invention, and can be freely combined within the scope of the present invention. The arbitrary constituent elements of the embodiments and the modifications can be appropriately modified or omitted.

For example, a subframe in the embodiments and the modifications is an example time unit of communication in the fifth generation base station communication system. The slot may be configured per scheduling. The processes described in the embodiments and the modifications as being performed per subframe may be performed per TTI, per slot, per sub-slot, or per mini-slot.

While the invention is described in detail, the foregoing description is in all aspects illustrative and does not restrict the present invention. Therefore, numerous modifications and variations that have not yet been exemplified are devised without departing from the scope of the present invention.

EXPLANATION OF REFERENCE SIGNS 200 communication system, 202 communication terminal device, 203 base station device.

The invention claimed is:

1. A user apparatus in a communication system comprising the user apparatus and a base station including a plurality of transmission reception points (TRPs) configured to wirelessly communicate with the user apparatus, wherein
the user apparatus transmits a physical random access channel (PRACH) after a first time from physical downlink control channel (PDCCH) order reception, and a second time for switching a TRP of the TRPs is included in the first time,
the second time is a time related to detection of a Synchronization Signal Block,
the PDCCH order includes information indicating switching to the TRP being a new destination, and
the user apparatus adds the second time to the first time based on the information.

2. The user apparatus according to claim 1, wherein the user apparatus transmits capability information including information related to the second time.

3. A base station in a communication system comprising a user apparatus and the base station including a plurality of transmission reception points (TRPs) configured to wirelessly communicate with the user apparatus, wherein
the user apparatus transmits a physical random access channel (PRACH) after a first time from physical downlink control channel (PDCCH) order reception, and a second time for switching a TRP of the TRPs is included in the first time,
the second time is a time related to detection of a Synchronization Signal Block,
the PDCCH order includes information indicating switching to the TRP being a new destination, and
the second time is added to the first time based on the information.

4. A communication system comprising: a user apparatus; and a base station including a plurality of transmission reception points (TRPs) configured to wirelessly communicate with the user apparatus, wherein
the user apparatus transmits a physical random access channel (PRACH) after a first time from physical downlink control channel (PDCCH) order reception, and a second time for switching a TRP of the TRPs is included in the first time,
the second time is a time related to detection of a Synchronization Signal Block,
the PDCCH order includes information indicating switching to the TRP being a new destination, and
the user apparatus adds the second time to the first time based on the information.

* * * * *